United States Patent
Gao et al.

(10) Patent No.: US 8,675,592 B2
(45) Date of Patent: Mar. 18, 2014

(54) METHODS, APPARATUS AND COMPUTER PROGRAMS FOR PHYSICAL LAYER TRANSMISSION AND/OR RECEPTION

(71) Applicant: Renesas Mobile Corporation, Tokyo (JP)

(72) Inventors: Chunyan Gao, Beijing (CN); Shuang Tan, Beijing (CN); Erlin Zeng, Beijing (CN); Tommi Tapani Koivisto, Espoo (FI); Tero Heikki Petteri Kuosmanen, Tampere (FI)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 13/764,279

(22) Filed: Feb. 11, 2013

(65) Prior Publication Data

US 2013/0308557 A1 Nov. 21, 2013

Related U.S. Application Data

(63) Continuation of application No. PCT/CN2012/075836, filed on May 21, 2012.

(30) Foreign Application Priority Data

Sep. 11, 2012 (GB) .................................... 1216162.6

(51) Int. Cl.
  *H04W 4/00* (2009.01)
(52) U.S. Cl.
  USPC ........................................ 370/329; 455/67.11
(58) Field of Classification Search
  USPC ........................................ 370/315, 329, 330
  See application file for complete search history.

(56) References Cited

U.S. PATENT DOCUMENTS

2011/0085513 A1* 4/2011 Chen et al. ..................... 370/330
2011/0317615 A1* 12/2011 Soong et al. ................... 370/315

OTHER PUBLICATIONS

XP050562297, "Mapping Design for E-PDCCH in Rel-11," 3GPP Draft, R1-114081, 3GPP TSG RAN WG1 Meeting #67, San Francisco, USA, Nov. 14-18, 2011, NTT Docomo, RAN WG1 (5 pages).
XP050600896, "E-CCE/E-REG definition and fallback operation for signaling independent mapping," 3GPP Draft, R1-122713, 3GPP TSC-RAN WG1 #69, Prague, Czech Republic, May 21-25, 2012, CMCC, RAN WG1 (3 pages).
XP050600594, "eREG and eCCE Defintiions for ePDCCH," 3GPP Draft, R1-122331, 3GPP TSG-RAN WG1#69, , Prague, Czech Republic, May 21-25, 2012, HTC, RAN WG1 (6 pages).
UKIPO Combined Search and Examination Report under Sections 17 and 18(3) dated Oct. 10, 2012 which is issued in a related British Application No. GB1216162.6 (7 page).

* cited by examiner

*Primary Examiner* — Wanda Z Russell
(74) *Attorney, Agent, or Firm* — Lucas & Mercanti LLP; Robert P. Michal

(57) ABSTRACT

Embodiments include a method for physical layer transmission in a network equipment including receiving, from a higher layer, messages to be transmitted during a subframe on one or more control channels. The number of elements required (i.e. aggregation level) for each control channel is determined. A plurality of physical resource blocks (PRBs) for transmitting the control channels and partitioning the PRBs into clusters is allocated. The interleaving depth (IDP) for each cluster is determined. Each element is mapped to a cluster according to the IDP for that cluster. A transmission signal including the clusters is generated.

26 Claims, 13 Drawing Sheets

METHODS, APPARATUS AND COMPUTER PROGRAMS FOR PHYSICAL LAYER TRANSMISSION AND/OR RECEPTION

CROSS REFERENCE TO RELATED APPLICATIONS

This application is a continuation of PCT International Patent Application No. PCT/CN2012/075836, filed on May 21, 2012, and claims the benefit under 35 U.S.C. §119 and 37 CFR §1.55 to UK Patent Application No. 1216162.6, filed on Sep. 11, 2012, the entire content, of each of which is incorporated herein by reference.

TECHNICAL FIELD

The present invention relates to methods, apparatus and computer programs for physical layer transmission and/or reception. The disclosure herein relates generally to the field of wireless or cellular communications, and particular examples relate to methods, devices, and network equipment using an enhanced control channel wherein the contents are interleaved among a plurality of physical resource blocks.

BACKGROUND INFORMATION

The Third Generation Partnership Project (3GPP) unites six telecommunications standards bodies, known as "Organizational Partners", and provides their members with a stable environment to produce the highly successful Reports and Specifications that define 3GPP technologies. These technologies are constantly evolving through what have become known as "generations" of commercial cellular/mobile systems. 3GPP also uses a system of parallel "releases" to provide developers with a stable platform for implementation and to allow for the addition of new features required by the market. Each release includes specific functionality and features that are specified in detail by the version of the 3GPP standards associated with that release.

Universal Mobile Telecommunication System (UMTS) is an umbrella term for the third generation (3G) radio technologies developed within 3GPP and initially standardised in Release 4 and Release 99, which preceded Release 4. UMTS includes specifications for both the UMTS Terrestrial Radio Access Network (UTRAN) as well as the Core Network. UTRAN includes the original Wideband CDMA (W-CDMA) radio access technology that uses paired or unpaired 5-MHz channels, initially within frequency bands near 2 GHz but subsequently expanded into other licensed frequency bands. The UTRAN generally includes node-Bs (NBs) and radio network controllers (RNCs). Similarly, GSM/EDGE is an umbrella term for the second-generation (2G) radio technologies initially developed within the European Telecommunication Standards institute (ETSI) but now further developed and maintained by 3GPP. The GSM/EDGE Radio Access Network (GERAN) generally comprises base stations (BSs) and base station controllers (BSCs).

Long Term Evolution (LTE) is another umbrella term for so-called fourth-generation (4G) radio access technologies developed within 3GPP and initially standardised in Releases 8 and 9, also known as Evolved UTRAN (E-UTRAN). As with UMTS, LTE is targeted at various licensed frequency bands, including the 700-MHz band in the United States. LTE is accompanied by improvements to non-radio aspects commonly referred to as System Architecture Evolution (SAE), which includes Evolved Packet Core (EPC) network. LTE continues to evolve through subsequent releases. One of the features under consideration for Release 11 is an enhanced Physical Downlink Control Channel (ePDCCH), which has the goals of increasing capacity and improving spatial reuse of control channel resources, improving inter-cell interference coordination (ICIC), and supporting antenna beam forming and/or transmit diversity for control channel.

SUMMARY

In a first exemplary embodiment of the invention, there is a wireless communication device, comprising: a transmitter; a receiver; a processor and at least one memory including program code which, when executed by the processor, causes the wireless communication device to: decode resource mapping information from a received subframe signal, the subframe signal comprising a plurality of physical resource blocks (PRBs); determine, based on the resource mapping information, information related to aggregation level (AL) of one or more control channels and information related to PRBs comprising one or more elements of the one or more control channels, the information related to PRBs comprising PRB cluster size wherein a PRB cluster comprises plural PRBs; decode one or more elements of a control channel from the subframe signal, based on the information related to the PRBs comprising that control channel and information related to the AL of that control channel, the decoding comprising determining interleaving depth (IDP) of the PRB cluster comprising the one or more elements of the control channel; form a control message from the one or more elements of the control channel; and provide the control message to a higher protocol layer.

In a second exemplary embodiment of the invention, there is a method for physical (PHY) layer reception in a wireless communication device, the method comprising: receiving a subframe signal comprising a plurality of physical resource blocks (PRBs); decoding resource mapping information from the subframe signal; determining, based on the resource mapping information, information related to aggregation level (AL) of one or more control channels and information related to PRBs comprising one or more elements of the one or more control channels, the information related to PRBs comprising PRB cluster size wherein a PRB cluster comprises plural PRBs; decoding one or more elements of a control channel from the subframe signal, based on the information related to the PRBs comprising that control channel and information related to the AL of that control channel, the decoding comprising determining interleaving depth (IDP) of the PRB cluster comprising the one or more elements of the control channel; forming a control message from the one or more elements of the control channel; and providing the control message to a higher protocol layer.

In some embodiments, the IDP for at least one of (or each) of the one or more PRB clusters has a linear relationship to the number of PRBs comprising that PRB cluster. In some embodiments, the IDP for at least one (or each) of the one or more PRB clusters is identical to the number of PRBs comprising that PRB cluster. In some embodiments, the IDP for at least one (or each) of the one or more PRB clusters has a relationship to the index of that PRB cluster. Embodiments include a wireless communication device (e.g. a user equipment or UE) and a computer-readable medium with program code embodying one or more of these methods.

In a third exemplary embodiment of the invention, there is a non-transitory computer-readable storage medium comprising a set of instructions stored thereon that, when executed on a wireless communication device, causes the wireless communication device to: decode resource mapping information from a received subframe signal, the subframe signal comprising a plurality of physical resource blocks (PRBs); determine, based on the resource mapping information, information related to aggregation level (AL) of one or more control channels and information related to PRBs comprising one or more elements of the one or more control channels, the information related to PRBs comprising PRB cluster size wherein a PRB cluster comprises plural PRBs; decode one or more elements of a control channel from the subframe signal, based on the information related to the PRBs comprising that control channel and information related to the AL of that control channel, the decoding comprising determining interleaving depth (IDP) of the PRB cluster comprising the one or more elements of the control channel; form a control message from the one or more elements of the control channel; and provide the control message to a higher protocol layer.

In a fourth exemplary embodiment of the invention, there is a network equipment, the network equipment comprising: a transmitter; a receiver; a processor and at least one memory including program code which, when executed by the processor, causes the network equipment to: determine an aggregation level (AL) for each of one or more control channels which are to be used to transmit, during a subframe using the one or more control channels, one or more messages received from one or more higher protocol layers, wherein the AL for a control channel comprises the number of elements required for the control channel; allocate a plurality of physical resource blocks (PRBs) for transmitting the one or more control channels and partitioning the plurality of PRBs into PRB clusters, each of said PRB clusters comprising plural PRBs; determine the interleaving depth (IDP) for each of the PRB clusters; map each of the elements to one of the PRB clusters according to the IDP determined for that PRB cluster; generate a transmission signal comprising the PRB cluster.

In a fifth exemplary embodiment of the invention, there is a method for physical (PHY) layer transmission in a network equipment, the method comprising: receiving, from one or more higher protocol layers, one or more messages to be transmitted during a subframe using one or more control channels; determining an aggregation level (AL) for each of the one or more control channels, wherein the AL for a control channel comprises the number of elements required for the control channel; allocating a plurality of physical resource blocks (PRBs) for transmitting the one or more control channels and partitioning the plurality of PRBs into PRB clusters, each of said PRB clusters comprising plural PRBs; determining the interleaving depth (IDP) for each of the PRB clusters; mapping each of the elements to one of the PRB clusters according to the IDP determined for that PRB cluster; and generating a transmission signal comprising the PRB cluster.

In some embodiments, the IDP for at least one (or each) of the PRB clusters has a linear relationship to the number of PRBs comprising that PRB cluster. In some embodiments, the IDP for at least one (or each) of the PRB clusters is identical to the number of PRBs comprising that PRB cluster. In some embodiments, the IDP for at least one (or each) of the PRB clusters has a relationship to the index of that PRB cluster. Other embodiments comprise network equipment (e.g. evolved Node B) and computer-readable media embodying one or more of the methods.

In a sixth exemplary embodiment of the invention, there is a rum-transitory computer-readable storage medium comprising a set of instructions stored thereon that, when executed by a network equipment, causes the network equipment to: determine an aggregation level (AL) for each of one or more control channels which are to be used to transmit, during a sub-frame using the one or more control channels, one or more messages received from one or more higher protocol layers, wherein the AL for a control channel comprises the number of elements required for the control channel; allocate a plurality of physical resource blocks (PRBs) for transmitting the one or more control channels and partitioning the plurality of PRBs into PRB clusters, each of said PRB clusters comprising plural PRBs; determine the interleaving depth (IDP) for each of the PRB clusters; map each of the elements to one of the PRB clusters according to the IDP determined for that PRB cluster; generate a transmission signal comprising the PRB cluster.

Further features and advantages of the invention will become apparent from the following description of preferred embodiments of the invention, given by way of example only, which is made with reference to the accompanying drawings.

DETAILED DESCRIPTION

Figure 1:
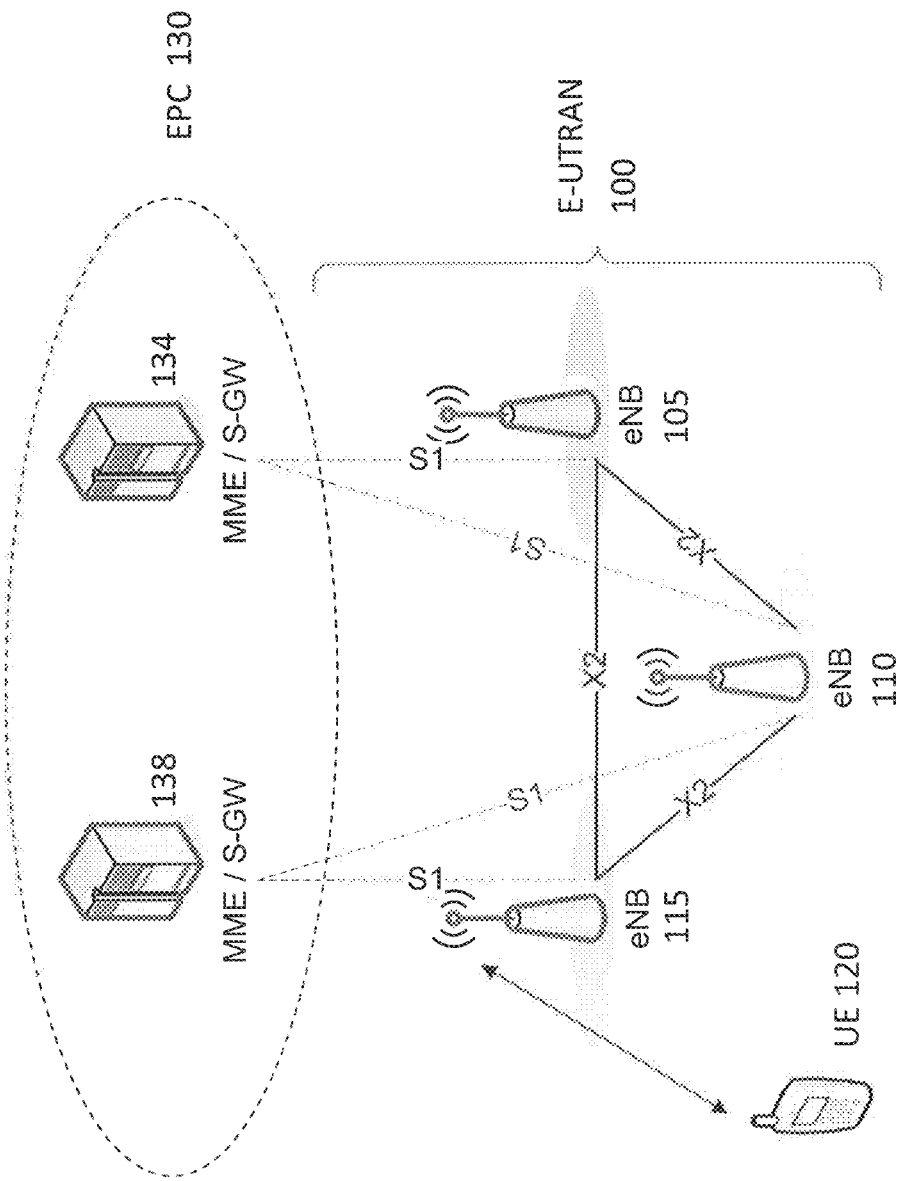
FIG. 1 is a high-level block diagram of the architecture of the Long Term Evolution (LTE) Evolved UTRAN (E-UTRAN) and Evolved Packet Core (EPC) network, as standardised by 3GPP.

The overall architecture of a network comprising LTE and SAE is shown schematically in FIG. 1. E-UTRAN 100 comprises one or more evolved Node Bs (eNB), such as eNBs 105, 110, and 115, and one or more user equipment (UEs), such as UE 120. As used within the 3GPP standards, "user equipment" or "UE" means any wireless communication device (e.g. smartphone or computing device) that is capable of communicating with 3GPP-standard-compliant network equipment, such as UTRAN, E-UTRAN, and/or GERAN, as the second-generation ("2G") 3GPP radio access network is commonly known.

As specified by 3GPP, E-UTRAN 100 is responsible for all radio-related, functions in the network, including radio bearer control, radio admission control, radio mobility control, scheduling, and dynamic allocation of resources to UEs in uplink and downlink, as well as security of the communications with the UE. These functions reside in the eNBs, such as eNBs 105, 110, and 115. The eNBs in the E-UTRAN communicate with each other via the X1 interface, as shown in FIG. 1A. The eNBs also are responsible for the E-UTRAN interface to the EPC, specifically the S1 interface to the Mobility Management Entity (MME) and the Serving Gateway (SGW), shown collectively as MME/S-GWs 134 and 138 in FIG. 1A. Generally speaking, the MME/S-GW handles both the overall control of the UE and data flow between the UE and the rest of the EPC. More specifically, the MME processes the signalling protocols between the UE and the EPC, which are known as the Non Access Stratum (NAS) protocols. The S-GW handles all Internet Protocol (IP) data packets between the UE and the EPC, and serves as the local mobility anchor for the data bearers when the UE moves between eNBs, such as eNBs 105, 110, and 115.

Figure 2A:
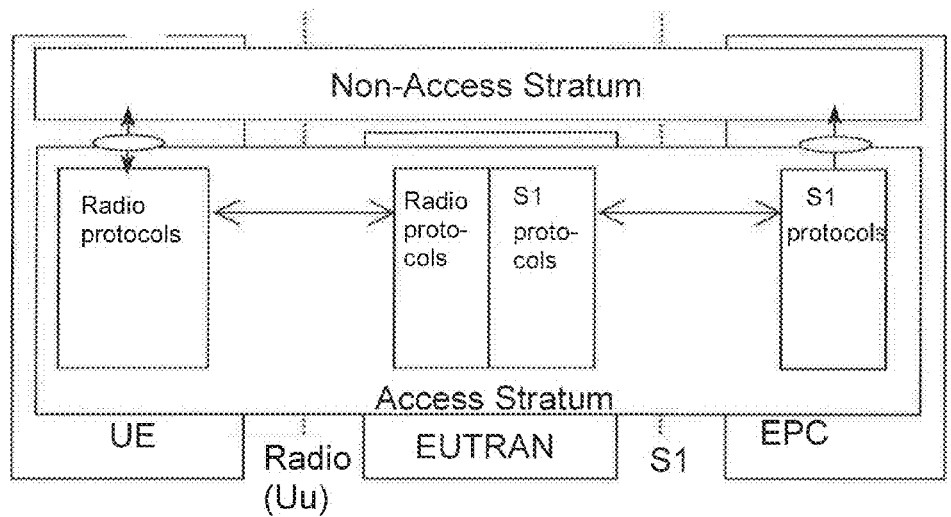
FIG. 2A is a high-level block diagram of the E-UTRAN architecture in terms of its constituent components, protocols, and interfaces.

FIG. 2A is a high-level block diagram of LTE architecture in terms of its constituent entities—UE, E-UTRAN, and EPC—and high-level functional division into the Access Stratum (AS) and the Non-Access Stratum (NAS). FIG. 2A also illustrates two particular interface points, namely Uu (UE/E-UTRAN Radio Interface) and S1 (E-UTRAN/EPC interface), each using a specific set of protocols, i.e. Radio Protocols and S1 Protocols. Each of the two protocols can be further segmented into user plane (or "U-plane") and control plane (or "C-plane") protocol functionality. On the Uu interface, the U-plane carries user information (e.g. data packets) while the C-plane carries control information between the UE and E-UTRAN.

Figure 2B:
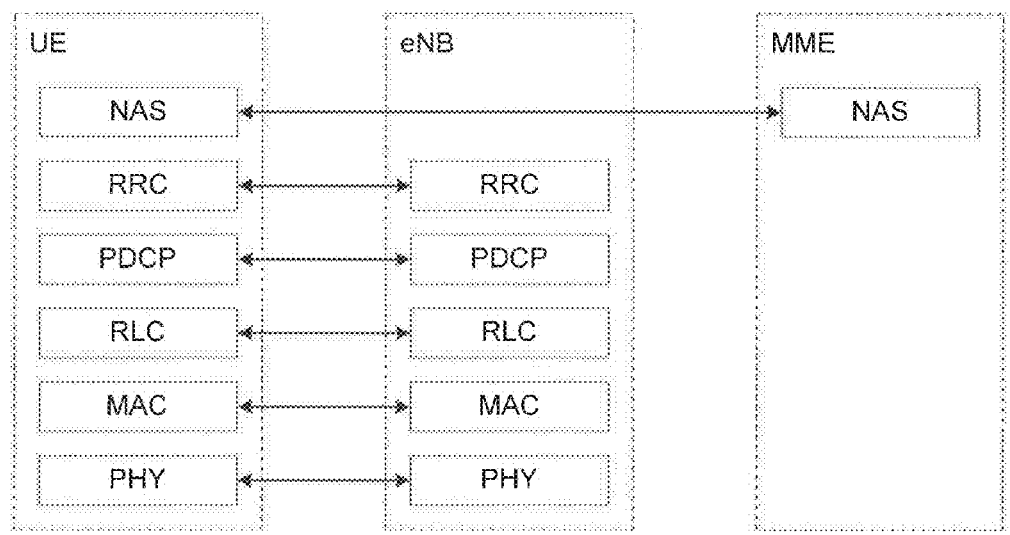
FIG. 2B is a block diagram of the protocol layers of the control-plane portion of the radio (Uu) interlace between a user equipment (UE) and the E-UTRAN.

FIG. 2B is a block diagram of the C-plane protocol stack on the Uu interface comprising Physical (PHY), Medium Access Control (MAC), Radio Link Control (RLC), Packet Data Convergence Protocol (PDCP), and Radio Resource Control (RRC) layers. The PHY layer is concerned with how and what characteristics are used to transfer data over transport channels on the LTE radio interface. The MAC layer provides data transfer services on logical channels, maps logical channels to PHY transport channels, and reallocates PHY resources to support these services. The RLC layer provides error detection and/or correction, concatenation, segmentation, reassembly, and reordering of data transferred to or from the upper layers. The PHY, MAC, and RLC layers perform identical functions for both the U-plane and the C-plane. The PDCP layer provides ciphering/deciphering and integrity protection for both U-plane and C-plane, as well as other functions for the U-plane such as header compression.

Figure 2C:
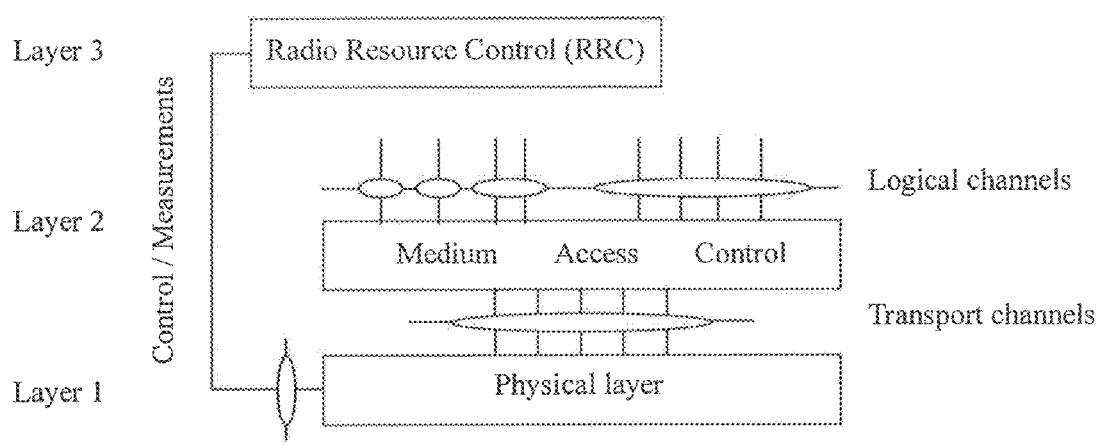
FIG. 2C is a block diagram of the LIE radio interface protocol architecture from the perspective of the PHY layer.

FIG. 2C is a block diagram of the LTE radio interface protocol architecture from the perspective of the PHY. The interfaces between the various layers are provided by Service Access Points (SAPs), indicated by the ovals in FIG. 2C. The PHY layer interfaces with the MAC and RRC protocol layers described above. The MAC provides different logical channels to the RLC protocol layer (also described above), characterised by the type of information transferred, whereas the PHY provides a transport channel to the MAC, characterised by how the information is transferred over the radio interface. In providing this transport service, the PHY performs various functions including error detection and correction; rate-matching and mapping of the coded transport channel onto physical channels; power weighting, modulation and demodulation of physical channels; transmit diversity; beam-forming multiple input multiple output (MIMO) antenna processing; and providing radio measurements to higher layers, such as RRC. Downlink (i.e. eNB to UE) physical channels provided by the LTE PHY include Physical Downlink Shared Channel (PDSCH), Physical Multicast Channel (PMCH), Physical Downlink Control Channel (PDCCH), Relay Physical Downlink Control Channel (R-PDCCH), Physical Broadcast Channel (PBCH), Physical Control Format Indicator Channel (PCFICH), and Physical Hybrid ARQ Indicator Channel (PHICH).

Figure 3:
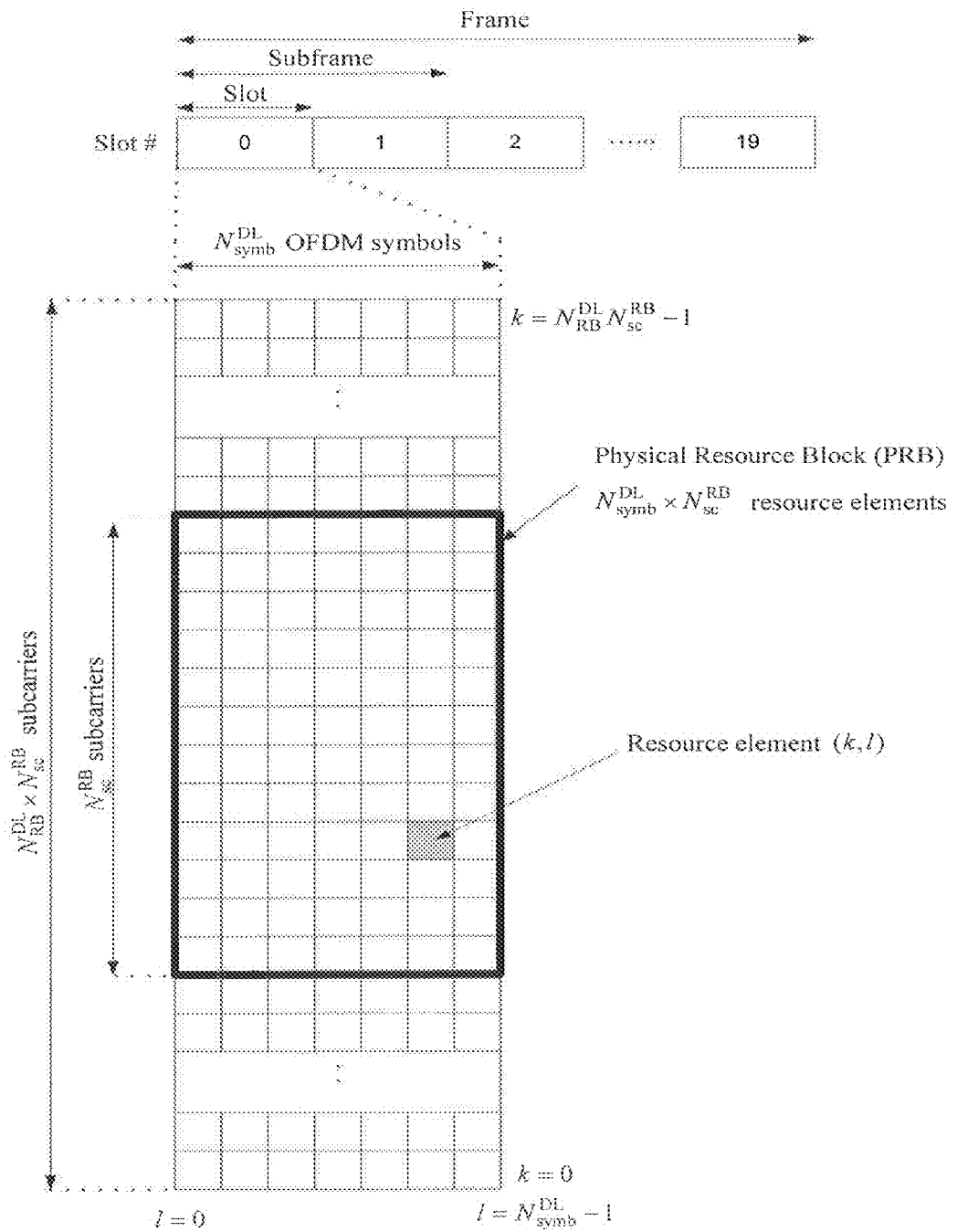
FIG. 3 is a block diagram of the type-1 LTE radio frame structure used for both full duplex and half-duplex FDD operation.

The multiple access scheme for the LTE PHY is based on Orthogonal Frequency Division Multiplexing (OFDM) with a cyclic prefix (CP) in the downlink, and on Single-Carrier Frequency Division Multiple Access (SC-FDMA) with a cyclic prefix in the uplink. To support transmission in paired and unpaired spectrum, the LTE PHY supports both Frequency Division Duplexing (FDD) (including both full- and half-duplex operation) and lime Division Duplexing (TDD). FIG. 3 shows the radio frame structure ("type 1") used for both full-duplex and half-duplex FDD operation. The radio frame has a duration of 10 ms and consists of 20 slots, labelled 0 to 19, each with a duration of 0.5 ms. A 1-ms subframe comprises two consecutive slots where subframe i consists of slots 2i and 2i+1. Each slot consists of NDLsymb OFDM symbols, each of which is comprised of Nsc OFDM subcarriers. The value of NDLsymb is typically 7 (with a normal CP) or 6 (with an extended-length CP) for subcarrier bandwidth of 15 kHz, or 3 (with a sub-carrier bandwidth of 7.5 kHz). The value of Nsc is configurable based upon the available channel bandwidth. Since persons of ordinary skill in the art will be familiar with the principles of OFDM, further details are omitted in this description.

As shown In FIG. 3, the combination of a particular subcarrier in a particular symbol is known as a resource element (RE). Each RE is used to transmit a particular number of bits, depending on the type of modulation and/or bit-mapping constellation used for that RE. For example, some REs may carry two bits using QPSK modulation, while other REs may carry four or six bits using 16- or 64-QAM, respectively. The radio resources of the LTE PHY are also defined in terms of physical resource blocks (PRBs). A PRB spans NRBsc subcarriers over the duration of a slot (i.e. NDLsymb symbols), where NRBsc is typically either 12. (with a sub-carrier bandwidth of 15 kHz) or 24 (with a sub-carrier bandwidth of 7.5 kHz). A PRB spanning the same NRBsc subcarriers during an entire subframe (i.e. 2NDLsymb symbols) is known as a PRB pair. Accordingly, the resources available in a subframe of the LTE PHY downlink comprise NDLRB PRB pairs, each of which comprises 2NDLsymb·NRBsc REs. For a normal CP and 15-KHz sub-carrier bandwidth, a PRB pair comprises 168 REs.

One characteristic of PRBs is that consecutively numbered PRBs (e.g. PRBi and PRBi+1) comprise consecutive blocks of subcarriers. For example, with a normal CP and 15-KHz sub-carrier bandwidth, PRB0 comprises sub-carrier 0 to 11 while PRB1 comprises sub-carriers 12 to 23. The LTE PHY resource can also be defined in terms of virtual resource blocks (VRBs), which are the same size as PRBs but may be of either a localised or a distributed type. Localised VRBs are mapped directly to PRBs such that VRB $n_{VRB}$ corresponds to PRB $n_{PRB}=n_{VRB}$. On the other hand, distributed VRBs may be mapped to non-consecutive PRBs according to various rules, as described in 3GPP Technical Specification (TS) 36.213 or otherwise known to persons of ordinary skill in the art. However, the term "PRB" will be used in this disclosure to refer to both physical and virtual resource blocks. Moreover, the term "PRB" will be used henceforth to refer to a resource block for the duration of a subframe, i.e. a PRB pair, unless otherwise specified.

Figure 4:
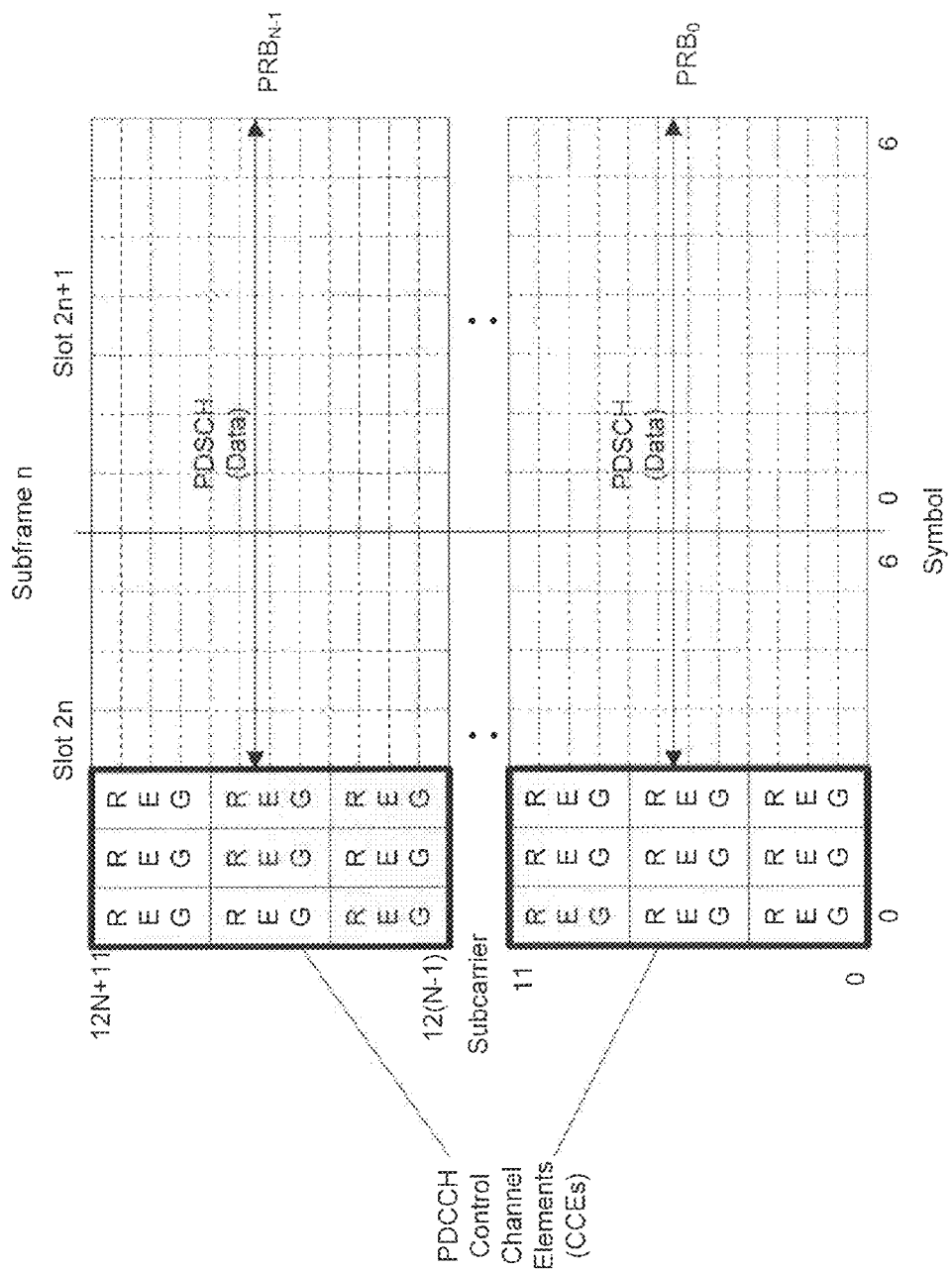
FIG. 4 is a block diagram illustrating one manner in which control channel elements (CCEs) and resource element groups (REGs) for a PDCCH can be mapped to LTE physical resource blocks (PRBs)

As mentioned above, the LTE PHY maps the various downlink physical channels to the resources shown in FIG. 3. For example, the PDCCH carries scheduling assignments and other control information. A physical control channel is transmitted on an aggregation of one or several consecutive control channel elements (CCEs), and a CCE is mapped to the physical resource shown in FIG. 3 based on resource element groups (REGs), each of which is comprised of a plurality of REs. For example, a CCE may be comprised of nine (9) REGs, each of which is comprised of four (4) REs. FIG. 4 illustrates one manner in which the CCEs and REGs can be mapped to the physical resource, i.e. PRBs. As shown in FIG. 4, the REGs comprising the CCEs of the PDCCH may be mapped into the first three symbols of a subframe, whereas the remaining symbols are available for other physical channels, such as the PDSCH which carries user data. Each of the REGs comprises four REs, which are represented by the small, dashed-line rectangles. Since QPSK modulation is used for the PDCCH, in the exemplary configuration of FIG. 4, each REG comprises eight (8) bits and each CCE comprises 72 bits. Although two CCEs are shown in FIG. 4, the number of CCEs may vary depending on the required PDCCH capacity, determined by number of users, amount of measurements and/or control signalling, etc. Moreover, other ways of mapping REGs to CCEs will be apparent to those of ordinary skill in the art.

Beginning with Release 11, the 3GPP specifications are planned to include an enhanced PDCCH (ePDCCH) in addition to the legacy PDCCH described above. The ePDCCH is intended to increase capacity and improve spatial reuse of control channel resources, improve inter-cell interference coordination (ICIC), and add antenna beamforming and/or transmit diversity support for the control channel. Much like the Release 8 PDCCH, the ePDCCH is constructed by aggregating one or more enhanced control channel elements (eCCEs). An eCCE is comprised of one or more enhanced resource element groups (eREGs), each of which is comprised of one or more REs. For example, an eCCE comprised of nine eREGs, each having four REs, may be configured with the same capacity as a CCE. Unlike CCEs, however, eCCEs may be flexibly configured with various numbers and sizes of eREGs.

Figure 5:
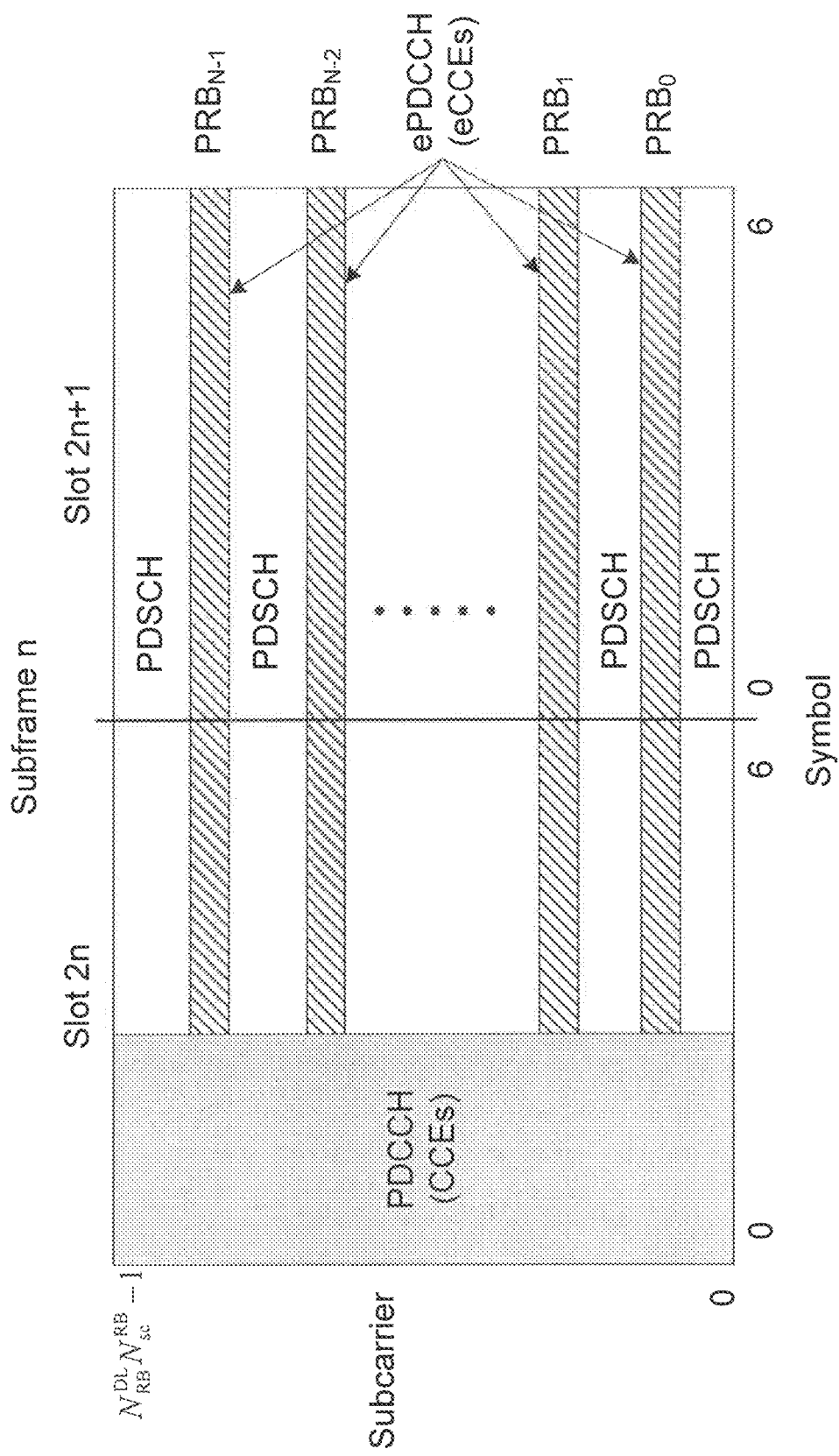
FIG. 5 is a block diagram illustrating an exemplary mapping of PDCCH, ePDCCH, and PDSCH to virtual or physical resource blocks, according to embodiments of the present disclosure.
Figure 6:
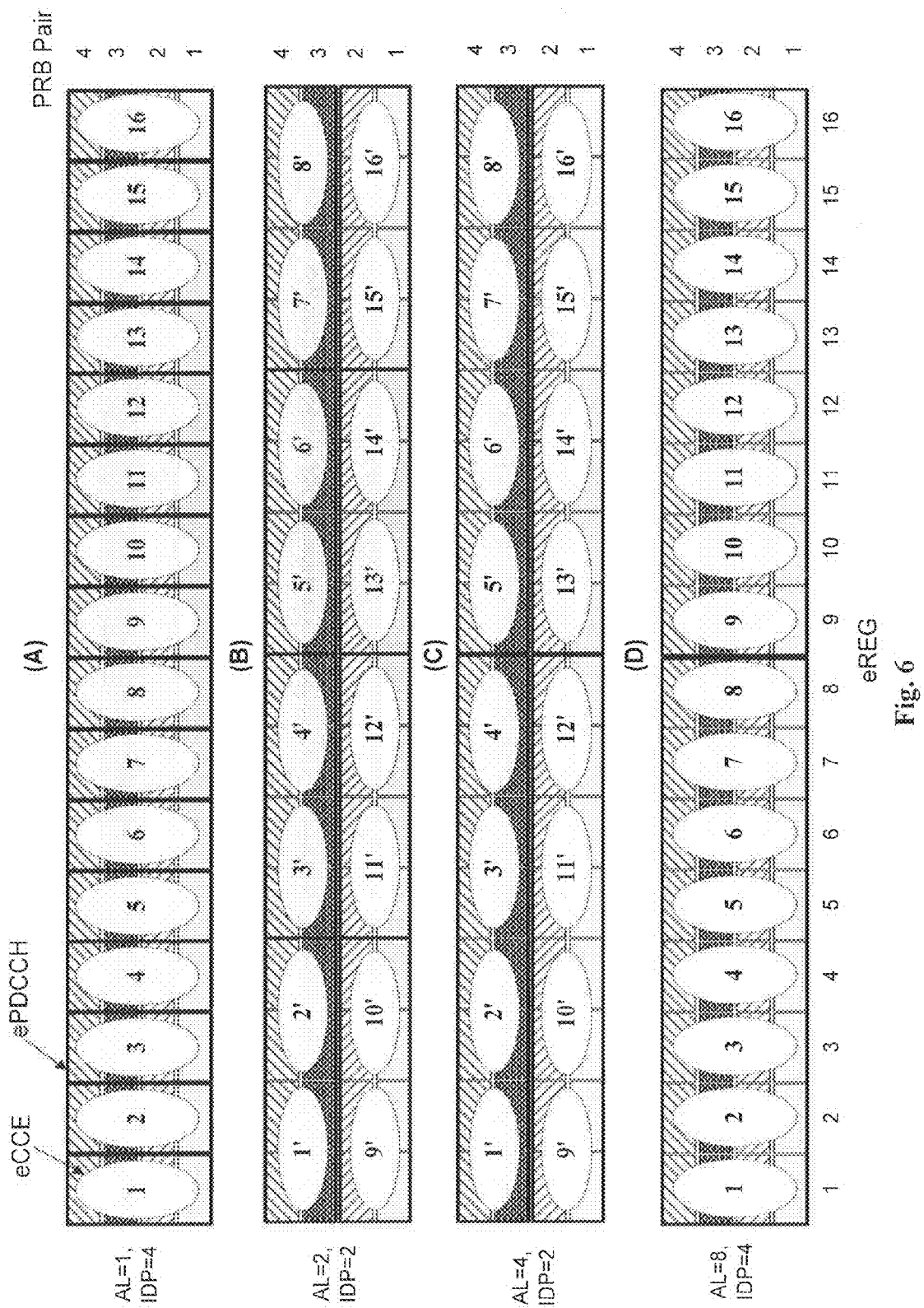
FIGS. 6A, 6B, 6C, and 6D are high-level block diagrams that illustrate exemplary eCCE-to-PRB mappings for different combinations of aggregation level (AL) and interleaving depth (IDP), according to one or more embodiments of the present disclosure.

Moreover, the ePDCCH (i.e. eCCEs) may be mapped to PRBs for transmission either in a localised or distributed manner. The localised mapping provides frequency selective scheduling gain and beamforming gain while the distributed transmission provides robust ePDCCH transmission via frequency diversity in case valid channel state information is not available to the receiver. For distributed mapping, if one eCCE is distributed to L PRB pairs, or in other words if one eCCE consists of REs/eREGs from L PRB pairs, this is defined as having an interleaving depth of L. A larger interleaving depth helps to obtain improved frequency diversity gain, but on the other hand, it also potentially results in increased resource fragmentation making resource reuse for PDSCH more difficult, especially when the control load is not high. Thus the choice of the interleaving depth is a trade off between achieving frequency diversity and enabling efficient reuse of resources to PDSCH. Hence in order to achieve sufficient frequency diversity, each eCCE must be mapped to a minimum number PRBs distributed sufficiently throughout the range of sub-carriers in the physical resource. For example, each eCCE may be distributed among four PRBs spaced apart within the range of subcarriers, in which case the interleaving depth would be four. This example is illustrated in FIG. 5, which shows the PHY resource for a subframe, i.e. two slots. In this example, the first three symbols of the subframe consist of the PDCCH, as described above. The remainder of the PHY resource is divided between the ePDCCH and the PDSCH, with N PRBs allocated to ePDCCH and the remaining PRBs allocated to the PDSCH and/or other physical channels as needed. Note that N may be a power of 2 (e.g. 4) or any other value that is suitable for use with the available physical resource. Moreover, the allocation between ePDCCH and PDSCH shown in FIG. 5 is merely exemplary and the person of ordinary skill in the art will recognise many other possible allocations and arrangements. Examples of embodiments described herein provide flexibility for the eNB to obtain a balance between frequency diversity and resource efficiency.

Figure 10A:
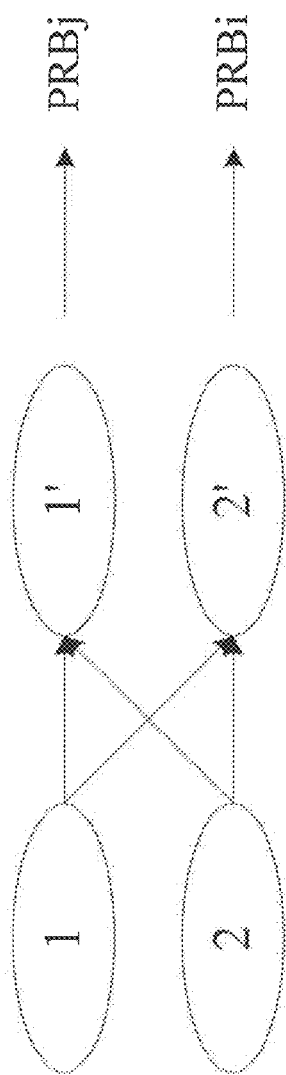
FIG. 10A is a block diagram that illustrates an example of interleaving, as applied to eCCEs or eREGs, according to embodiments of the present disclosure.

According to embodiments of the present disclosure, an ePDCCH comprised of N aggregated eCCEs is provided, and can be allocated among PRBs in various ways. The N aggregated eCCEs may be processed, such as by scrambling or interleaving, prior to being allocated to PRBs. FIG. 10A illustrates this operation for M=2. In FIG. 10A, two original eCCEs, eCCE1 and eCCE2, are scrambled to form two resultant eCCEs, eCCE1' and eCCE2'. Each of the resultant eCCEs comprises unique parts of the originals eCCEs (e.g. different eREGs). Each of the resultant eCCEs is allocated to a respective single PRB. For the non-aggregated case (i.e. M=T), the single eCCE is allocated to a single PRB, which in some cases may not provide the desired frequency diversity.

In another embodiment M eCCEs comprising the ePDCCH are allocated to PRBs at the eREG level. In other words, if each of the M eCCEs comprises N eREGs, then the N eREGs are distributed to N PRBs to achieve frequency diversity. The N aggregated eCCEs may be processed, such as by scrambling or interleaving, prior to being allocated to PRBs. FIG. 10A illustrates this operation for N=2. In FIG. 10A, two original eREGs, eREG1 and eREG2, are scrambled to form two resultant eREGs, eREG1' and eREG2'. Each of the resultant eREGs comprises unique parts of the originals eREGs. Each of the resultant eREGs is allocated to a respective single PRB. For the non-aggregated case (i.e. M=1), the single eCCE is allocated to N different PRBs (one per eREG), which achieves frequency diversity.

FIGS. 6A to 6D further Illustrate by examples how a network equipment (e.g. an eNB) maps eCCEs to PRBs at the eREG level according to one or more embodiments of the present disclosure. In each of these figures, the fundamental unit (represented by the smallest rectangle with various shadings) corresponds to one PRB comprising the capacity for one eREG, with one eCCE comprising four eREGs. Although a physical resource comprising four PRB pairs and 16 eREGs per PRB pair is used for illustration, these numbers are not limiting and any combination of eREGs and number of PRBs may be used within the spirit and scope of the present disclosure. Similarly, although ePDCCH traffic of 16 eCCEs each comprising four eREGs is used for illustration, any number and size of eCCEs also may be used within the spirit and scope of the present disclosure.

FIGS. 6A to 6D illustrate the eCCE-to-PRB mappings for four different combinations of aggregation level (AL) (i.e. number of eCCEs per ePDCCH) and interleaving depth (IDP). As already described above, here the IDP means to how many PRB pairs one eCCE distributes. In other words, each of the ALs in the set {1, 2, 4, 8} has a corresponding IDP, e.g. {4, 2, 2, 4}. The person of ordinary skill in the art will recognise that this mapping is merely exemplary, and other mappings between ALs and IDPs may be used. FIG. 6A illustrates the mapping for the combination AL=1, IDP=4. Each ePDCCH utilises only a single eCCE comprising four eREGs, and each eREG is allocated to a different PRB pair. In oilier words, eREGs in the four PRB pairs are interleaved, and the resultant eREGs are used to form each ECCE.

FIG. 6B illustrates the mapping of eCCEs to PRBs at the eREG level for the combination of AL=2, IDP=2. In this case, each eCCE is formed by eREGs from two PRB pairs, and two eCCEs are aggregated to form a particular ePDCCH For example, eREGs in PRB pair 3 and PRB pair 4 are interleaved to form eCCE1' to eCCE8', and then eCCE1' to eCCE2' are aggregated to get one ePDCCH. Similarly, FIG. 6C illustrates the mapping of eCCEs to PRBs at the eREG level for the combination of AL=4, IDP=2. In this case, each eCCE is formed by eREGs from two PRB pairs, and the four eCCEs are aggregated to form a particular ePDCCH. For example, eREGs in PRB pair 3 and PRB pair 4 are interleaved to form eCCE1' to eCCE8', then eCCE1' to eCCE4' are aggregated to get one ePDCCH. Finally, FIG. 6D illustrates the mapping of eCCEs to PRBs at the eREG level for the combination of AL=8, IDP=4. In this case, eREGs in PRB pair 1 to PRB pair 4 are interleaved to form eCCE1 to eCCE16, then eCCE1 to eCCE8 are aggregated to get one ePDCCH. In other words, each eCCE in FIG. 6D is mapped to the eREGs in the same manner as described with reference to FIG. 6A.

Figure 7:
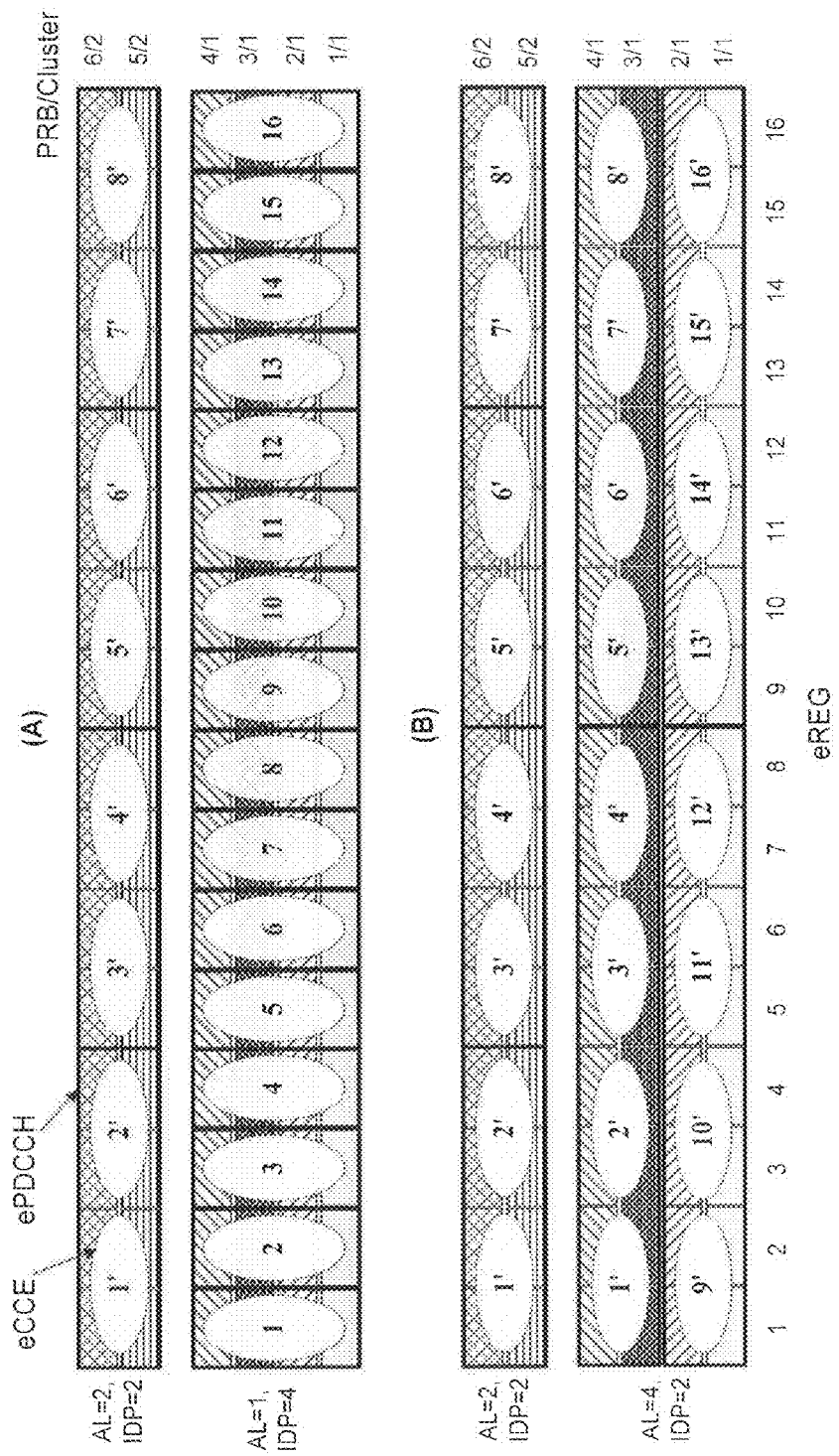
FIGS. 7A and 7B are high-level block diagrams that illustrate other exemplary eCCE-to-PRB mappings for different combinations of cluster size, aggregation level (AL), and interleaving depth (IDP), according to one or more embodiments of the present disclosure.

FIGS. 7A and 7B further illustrate by examples how a network equipment (e.g. an eNB) maps eCCEs to PRBs at the eREG level according to one or more other embodiments of the present disclosure. In these embodiments, the physical resource is segmented into various clusters of PRBs. Within each cluster, the interleaving depth (IDP) is determined by the cluster size, i.e. the number of PRBs within the cluster. In some embodiments, IDP is identical to the cluster size, while in other embodiments IDP is related in some other way to the cluster size, e.g. linearly related. IDP may be determined from cluster size and/or cluster index, for example by computational formula or lookup table.

In FIG. 7A, the physical resource comprises two clusters of PRBs: cluster 1 with four PRBs (numbered 1 to 4) and cluster 2 with two PRBs (numbered 5 and 6). Accordingly, cluster 1 utilises an IDP=4 and cluster 2 utilises an IDP=2. Aggregation levels (ALs) of 2 and 1 eCCEs for clusters 1 and 2, respectively, are used for purposes of illustration only; other AL values may be used within, the spirit and scope of the present disclosure. The eCCE size in FIG. 7A is four eREGs as in FIGS. 6A to 6D. As such, the mapping in cluster 1 is performed identically to the mapping shown in FIG. 6A, while the mapping in cluster 2 is performed identically to the mapping for two PRBs (e.g. PRBs 1 and 2 or PRBs 3 and 4) shown in FIG. 6B.

FIG. 7B further illustrates by example the mapping of eCCEs to PRBs at the eREG level according to one or more other embodiments of the present disclosure. In FIG. 7B, the physical resource comprises two clusters of PRBs: cluster 1 with four PRBs (numbered 1 to 4) and cluster 2 with two PRBs (numbered 5 and 6). Cluster 1 utilises an AL-specific IDP, as described above with reference to FIGS. 6A to 6D. However, the IDP in cluster 2 is determined by the cluster size, i.e. the number of PRBs within the cluster, as described above with reference to FIG. 7A. In this manner, the network equipment can configure IDP for each PRB cluster independently of how it configures IDP for other clusters. Persons of ordinary skill will recognise that the mappings shown in FIGS. 7A and 7B are used as examples to illustrate embodiments where the network equipment determines IDP by PRB cluster size and/or index, and that other mappings according to these embodiments may be used within the spirit and scope of the present disclosure.

Figure 8A:
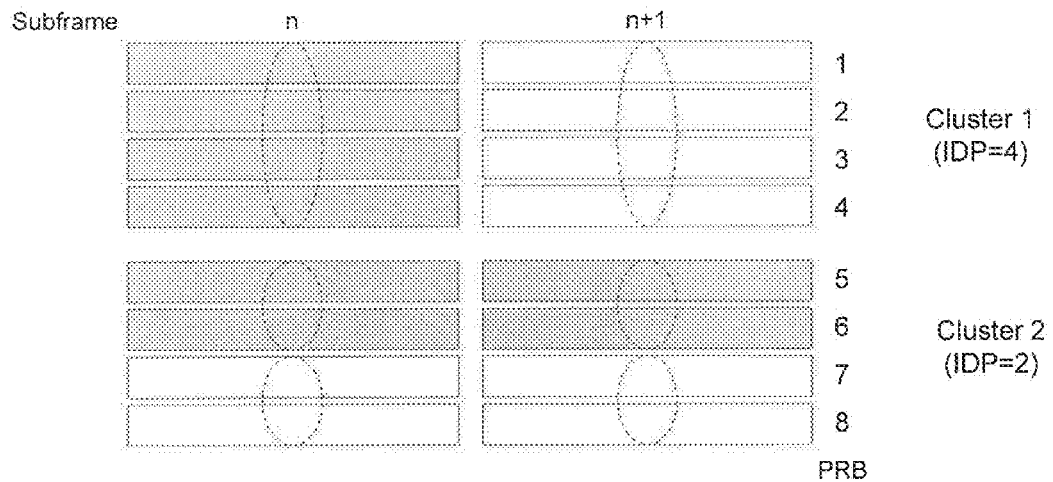
FIGS. 8A and 8B are high-level block diagrams that illustrate how PRBs or clusters of PRBs may be allocated between ePDCCH and PDSCH on an as-needed basis, according to one or more other embodiments of the present disclosure.
Figure 8B:
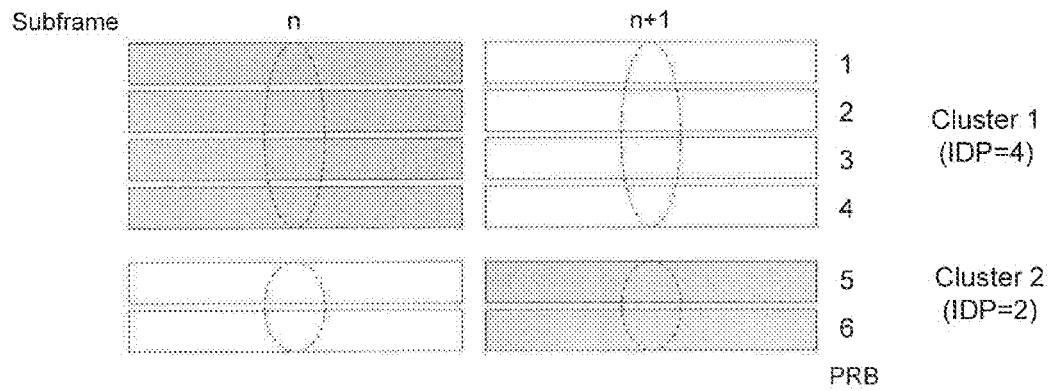

FIGS. 8A and 8B further illustrate examples of embodiments of the present disclosure in which PRBs or clusters may be allocated between ePDCCH and PDSCH on an as-needed basis. In FIG. 8A, the available physical resource comprises two clusters: cluster 1 comprising four PRB pairs utilising IDP=4, and cluster 2 comprising four PRBs utilising IDP=2. The choice of IDP in the clusters of FIG. 8A Is determined by cluster index, i.e. IDP=4 for cluster 1 and IDP=2 for cluster 2. In subframe n, the network has a relatively high amount of ePDCCH traffic and transmits eCCEs on PRBs 1 to 6 (indicated by the shading in the corresponding rectangles) while allocated PRBs 7-8 to PDSCH traffic (indicated by no shading in the corresponding rectangles). In subframe n+1, the amount of ePDCCH traffic decreases such that the network uses only PRBs 5 and 6 of cluster 2 to transmit eCCEs while allocating PRBs 1-4 and 7-8 to PDSCH traffic.

FIG. 8B illustrates allocation between ePDCCH and PDSCH according to other embodiments of the present disclosure. In FIG. 8B, the available physical resource comprises two clusters: cluster 1 comprising four PRB pairs utilising an IDP=4, and cluster 2 comprising two PRBs utilising an IDP=2. The choice of IDP in the clusters of FIG. 8B is determined by the cluster size (i.e. the number of PRBs within the cluster), as described above with reference to FIGS. 7A and 7B. In subframe n, the network has a relatively high amount of ePDCCH traffic and transmits eCCEs on PRBs 1-4 (indicated by the shading in the corresponding rectangles) while allocating PRBs 5-6 to PDSCH traffic (indicated by no shading in the corresponding rectangles). In subframe n+1, the amount of ePDCCH traffic decreases such that the network uses the smaller cluster 2 (PRBs 5-6) to transmit eCCEs while allocating larger cluster 1 (PRBs 1-4) to carry PDSCH traffic. In this manner, embodiments of the present disclosure provide flexible allocation of the physical resource according to the mixture of ePDCCH and PDSCH traffic.

Figure 9A:
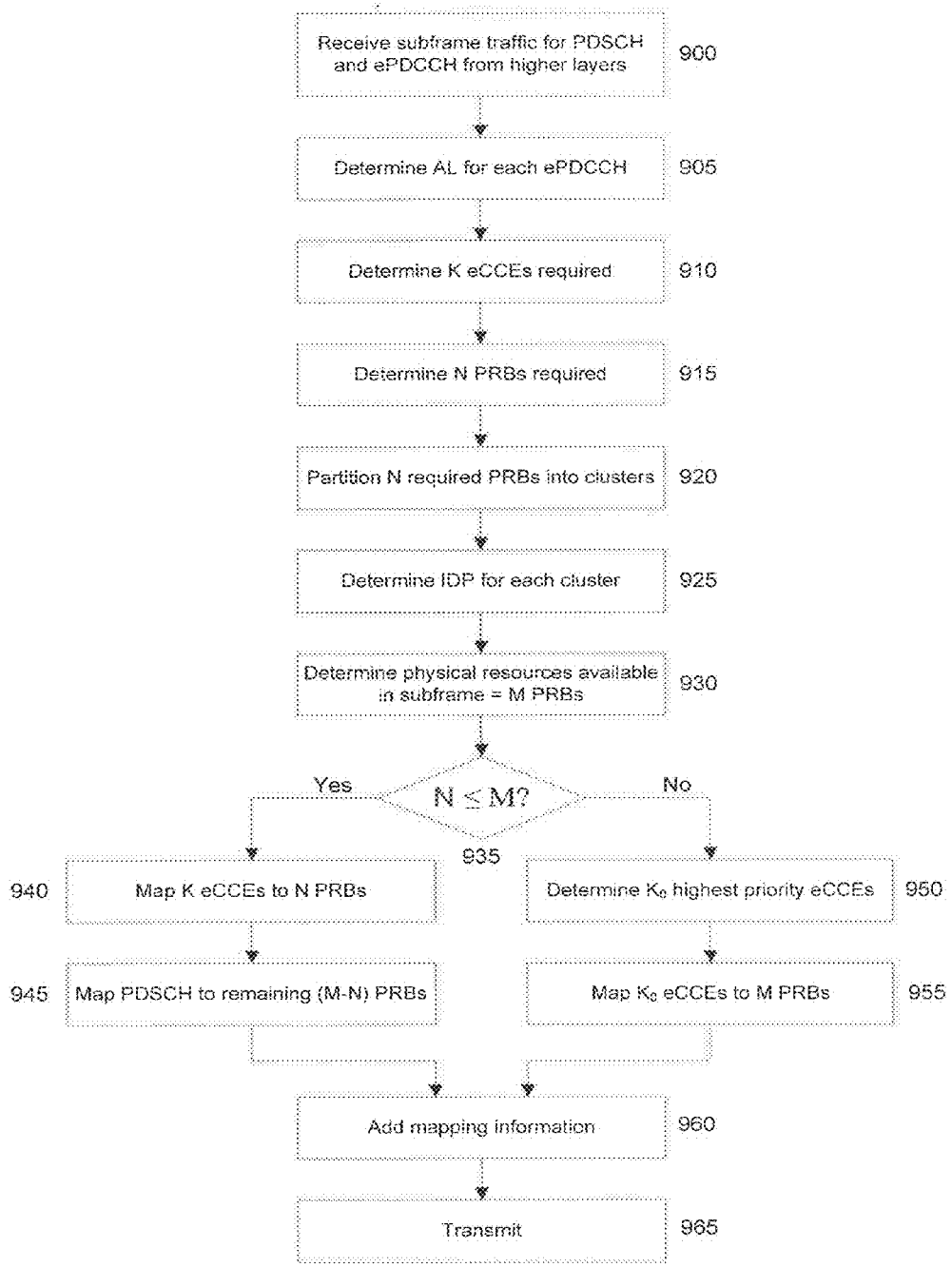
FIG. 9A is a flowchart of an exemplary PHY-layer method in a network equipment, such as an eNB, according to one or more embodiments of the present disclosure.

FIG. 9A is a flowchart of an example of a PHY-layer transmission method according to one or more embodiments of the present disclosure. While the PHY-layer transmission method of FIG. 9A is described in terms of being performed for downlink transmission in a network equipment (e.g. an eNB), it also may be performed for uplink transmission in a user equipment in some embodiments. Moreover, although the method is illustrated by blocks in the particular order of FIG. 9A, this order is merely exemplary and the steps of the method may be performed in a different order than shown by FIG. 9A, and may be combined and/or divided into blocks having different functionality.

In block 900, the PHY layer of the network equipment receives from higher layers (e.g. MAC and RRC layers, as described above with reference to FIG. 2C) the control and data traffic to be mapped to the physical channels for a subframe, comprising control traffic to be mapped to ePDCCH channels and data traffic to be mapped to PDSCH. In block 905, the PHY layer determines the number of ePDCCH channels and the aggregation level (AL) for each ePDCCH channel, e.g. AL=1, 2, 4, or 8, as the case may be. In block 910, the PHY layer determines that a total of K eCCEs are required to carry the ePDCCH control traffic for this subframe. In block 915, the PHY layer determines that N PRBs are required to carry the K eCCEs. In block 920, the PHY layer determines a preliminary partitioning of N required PRBs into PRB clusters. In block 925, the PHY layer determines an interleaving depth (IDP) for each PRB cluster. The IDP for the various clusters in the preliminary partition may be determined according to one or more of the methods described above with reference to FIGS. 6A to 6D and FIGS. 7A to 7B for example.

In block 930, the PHY layer determines that M PRBs are available for use to carry the control and data traffic received in block 900. In block 935, the PHY layer compares the number of required PRBs (N) to the number of available PRBs (M). If N≤M, the PHY layer processing proceeds to block 940, where the K eCCEs are mapped to N PRBs according to one or more methods described above by way of example with reference to FIGS. 6A to 6I) and FIGS. 7A to 7B. The PHY layer processing then proceeds to block 945 where the PDSCH traffic is mapped to the remaining (M−N) PRBs that were not used for ePDCCH. On the other hand, if N>M, the processing proceeds to block 950 where the PHY layer determines the K0<K highest priority eCCEs to transmit in the present subframe. The PHY layer may make this determination based on priority information received from the higher layers, information regarding previous ePDCCH transmissions, other information within the PHY layer, and/or information specified by relevant 3GPP standards or otherwise known by persons of ordinary skill in the art. In block 955, the K0 eCCEs are mapped to the M available PRBs according to one or more methods described above by way of example with reference to FIGS. 6A to 6D and FIGS. 7A to 7B.

Regardless of the block 935 result, the PHY layer proceeds to block 960 where it may provide information related to the mapping of ePDCCH and/or PDSCH to the physical resource for the current subframe, for inclusion in the transmission. In some embodiments, this information may include starting points and/or ranges for the PRBs used for the ePDCCH; number and sizes (in PRBs) of PRB clusters; interleaving depth (IDP) for each PRB cluster; and/or aggregation levels (ALs) used in the ePDCCH. In some embodiments, the PHY layer may provide this information using a physical format indicator channel (PCFICH) standardised by 3GPP, or improvements thereto, such as an enhanced PCFICH (ePCFICH). In other embodiments, the PHY layer may provide this information using a legacy PDCCH. In certain embodiments, the PHY layer may map this information related to the mapping of ePDCCH and/or PDSCH to a predetermined location within the physical resource, i.e. a particular set of REs. In block 965, the PHY layer transmits a subframe of OFDM symbols comprising the ePDCCH, PDSCH (if included), and any information related to mapping (e.g. PCFICH or ePCFICH). This transmission may involve one or more of the LTE PHY layer functionality described above, e.g. RF processing, beamforming, transmit diversity, MIMO, etc.

Figure 9B:
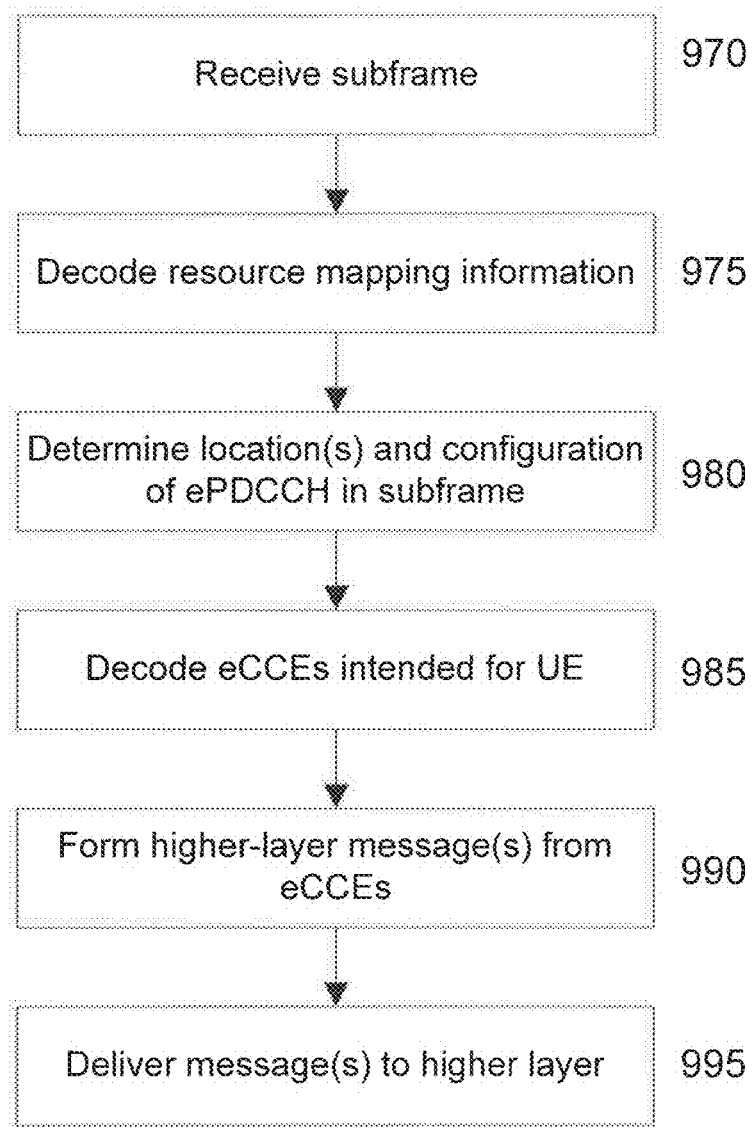
FIG. 9B is a flowchart of an exemplary PHY-layer method in a wireless communication device, such as a UE, according to embodiments of the present disclosure.

FIG. 9B is a flowchart of an example of a PHY-layer reception method according to one or more embodiments of the present disclosure. While the PHY-layer reception method of FIG. 9B is described in terms of being performed in a user equipment (i.e. for downlink reception), it also may be performed in a network equipment in some embodiments. Moreover, although the method is illustrated by blocks in the particular order of FIG. 9B, this order is merely exemplary and the steps of the method may be performed in a different order than shown by FIG. 9B, and may be combined and/or divided into blocks having different functionality.

In block 970, the PHY layer of the user equipment, receives a subframe of OFDM symbols comprised of resource elements arranged in a format described above by way of example with reference to one or more of FIGS. 3 to 7. In block 975, the PHY layer decodes resource mapping information that describes the arrangement of physical channels, e.g. ePDCCH, PDSCH, etc., within the subframe. For example, the PHY layer may decode this information by decoding PCFICH, ePCFICH, PDCCH, or other information in a predetermined location in the subframe. In block 980, the PHY layer determines the locations and/or configuration of the ePDCCH within the subframe physical resource based on, at least in part, the resource mapping information decoded in block 975. This may include, for example, determining the particular PRBs comprising the ePDCCH, clustering of PRBs, eCCE size, interleaving depth (IDP) within the PRBs, ePDCCH aggregation levels (ALs), or other related parameters.

In block 985, the PHY layer searches the ePDCCH based on the location(s) and/or configuration determined in block 980, and decodes the eCCEs intended for it. In some embodiments, this may include de-interleaving eCCEs across particular PRBs (or clusters of PRBs) according to the appropriate IDP, as described above by way of example with reference to one or more of FIGS. 6 to 8. In block 990, the PHY layer forms one or more higher-layer control messages from the eCCEs decoded in block 985. In block 995, the PHY layer delivers these one or more higher-layer messages to the appropriate protocol layer, e.g. MAC or RRC.

Figure 10B:
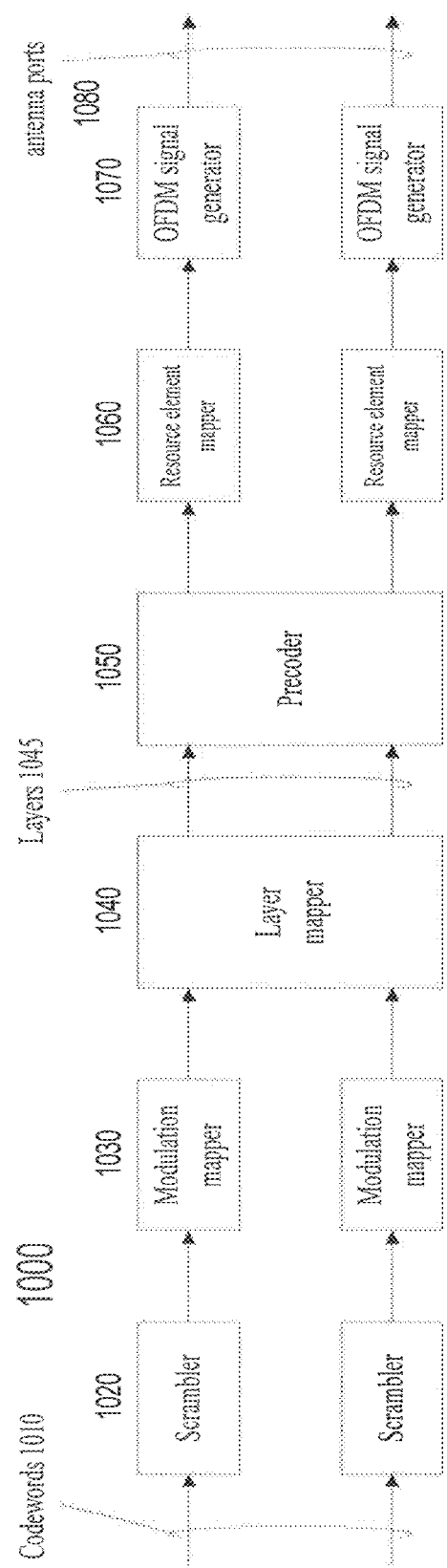
FIG. 10B is a block diagram of an example of a PHY-layer transmitter according to one or more embodiments of the present disclosure.

FIG. 10B is a diagram of an example of a PHY layer transmitter 1000 according to one or more embodiments of the present disclosure. In some embodiments, the PHY layer transmitter is capable of performing the method described above with reference to FIG. 9A, mapping eCCEs to PRBs at the eREG level according to one or more of the embodiments described above with reference to FIGS. 6A to 6D and FIGS. 7A to 7B. Beginning from the left side of FIG. 10B, a scrambler 1020 applies scrambling to a block of codewords 1010 representing the coded bits to be transmitted on the physical channel in one subframe. Each codeword in the block of scrambled codewords is then modulated by modulation mapper 1030 using one of the modulation schemes comprising one or more of BPSK, QPSK, 8-PSK, 16-QAM, 64-QAM, or other modulation schemes known to persons of ordinary skill in the art. The output of modulation mapper 1030 is a block of modulated codewords, which are mapped by layer mapper 1040 onto one or several layers, each of which corresponds to one of the available antenna ports 1080. Subsequently, the collection of layers output by layer mapper 1040 are processed by precoder 1050 for spatial multiplexing on the antenna ports 1080, such as by applying cyclic delay diversity (CDD) to the various layers and providing channel state information (CSI).

Next, in the block labelled resource mapper 1060, the block of complex-valued symbols for each of the antenna ports 1080 used for transmission of the physical channel are power-regulated and then mapped to resource elements (REs) in the subframe. This includes mapping into PRBs corresponding to the virtual resource blocks assigned for transmission in that subframe, as well as applying interleaving among PRBs such as described above with reference to FIGS. 6 to 10. Resource mapper 1060 provides resource mapping for all physical channels including PDCCH, ePDCCH, PDSCH, PCFICH, etc. Once all channels have been mapped for each antenna port 1080, OFDM signal generator 1070 generates time-domain subframe signals for each antenna port 1080 using the respective subframes of resource elements. These time-domain signals may then be transmitted on each of the respective antennas.

Figure 11:
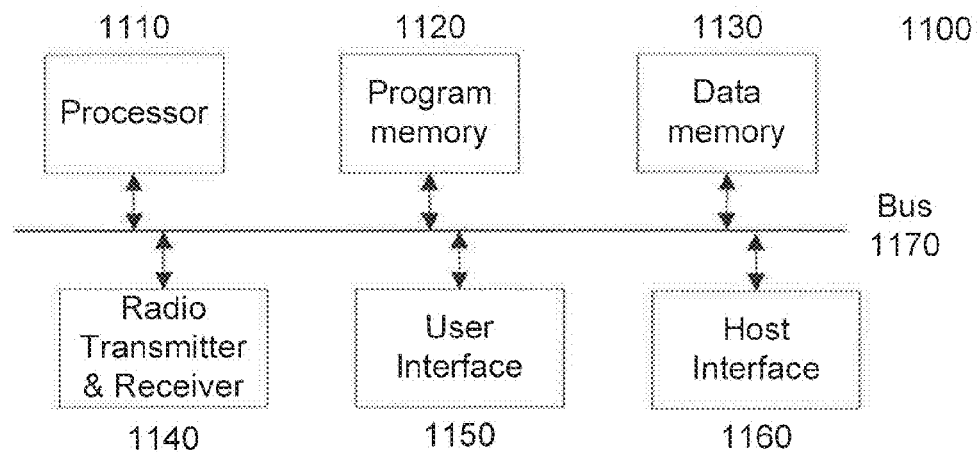
FIG. 11 is a block diagram of an exemplary wireless communication device, such as a UE, according to one or more embodiments of the present disclosure.

FIG. 11 is a block diagram of an exemplary wireless communication device or apparatus, such as a UE, utilising certain embodiments of the present disclosure, including one or more of the methods described above with reference to the figures. Device 1100 comprises processor 1110 which is operably connected to program memory 1120 and data memory 1130 via bus 1170, which may comprise parallel address and data buses, serial ports, or other methods and/or structures known to those of ordinary skill in the art. Program memory 1120 comprises software code executed by processor 1110 that enables device 1100 to communicate with one or more other devices using protocols according to various embodiments of the present disclosure, including the LTE PHY protocol layer and improvements thereto, including those described above with reference to FIGS. 6 to 9. Program memory 1120 also comprises software code executed by processor 1110 that enables device 1100 to communicate with one or more other devices using other protocols or protocol layers, such as LTE MAC, RLC, PDCP, and RRC layer protocols standardised by 3GPP, or any improvements thereto; UMTS, HSPA, GSM, GPRS, EDGE, and/or CDMA2000 protocols; Internet protocols such as IP, TCP, UDP, or others known to persons of ordinary skill in the art; or any other protocols utilised in conjunction with radio transceiver 1140, user interface 1150, and/or host interface 1160. Program memory 1120 further comprises software code executed by processor 1110 to control the functions of device 1100, including configuring and controlling various components such as radio transceiver 1140, user interface 1150, and/or host interface 1160. Such software code may be specified or written using any known or future developed programming language, such as e.g. Java, C++, C, and Assembler, as long as the desired functionality, e.g. as defined by the implemented method steps, is preserved.

Data memory 1130 may comprise memory area for processor 1110 to store variables used in protocols, configuration, control, and other functions of device 1100. As such, program memory 1120 and data memory 1130 may comprise non-volatile memory (e.g. flash memory), volatile memory (e.g. static or dynamic RAM), or a combination thereof. Persons of ordinary skill in the art will recognise that processor 1110 may comprise multiple individual processors (not shown), each of which implements a portion of the functionality described above. In such cases, multiple individual processors may be commonly connected to program memory 1120 and data memory 1130 or individually connected to multiple individual program memories and or data memories. More generally, persons of ordinary skill in the art will recognise that various protocols and other functions of device 1100 may be implemented in many different combinations of hardware and software including, but not limited to, application processors, signal processors, general-purpose processors, multi-core processors, ASICs, fixed digital circuitry, programmable digital circuitry, analog baseband circuitry, radio-frequency circuitry, software, firmware, and middleware.

Radio transceiver 1140 may comprise radio-frequency transmitter and/or receiver functionality that enables device 1100 to communicate with other equipment supporting like wireless communication standards. In an exemplary embodiment, radio transceiver 940 includes an LTE transmitter and receiver that enable device 1100 to communicate with various E-UTRANs according to standards promulgated by 3GPP. In some embodiments, radio transceiver 1140 includes circuitry, firmware, etc. necessary for device 1100 to communicate with network equipment using the LTE PHY protocol layer methods and improvements thereto such as those described above with reference to FIGS. 6 to 10. In some embodiments, radio transceiver 1140 includes circuitry, firmware, etc. necessary for device 1100 to communicate with various UTRANs and GERANs. In some embodiments, radio transceiver 1140 includes circuitry, firmware, etc. necessary for device 1100 to communicate with various CDMA2000 networks.

In some embodiments, radio transceiver 1140 is capable of communicating on a plurality of LTE frequency-division-duplex (FDD) frequency bands 1 to 25, as specified in 3GPP standards. In some embodiments, radio transceiver 1140 is capable of communicating on a plurality of LTE time-division-duplex (TDD) frequency bands 33 to 43, as specified in 3GPP standards. In some embodiments, radio transceiver 1140 is capable of communicating on a combination of these LTE FDD and TDD bands, as well as other bands specified in the 3GPP standards. In some embodiments, radio transceiver 1140 is capable of communicating on one or more unlicensed frequency bands, such as the ISM band in the region of 2.4 GHz. The radio functionality particular to each of these embodiments may be coupled with or controlled by other circuitry in device 1100, such as processor 1110 executing protocol program code stored in program memory 1120.

User interface 1150 may take various forms depending on the particular embodiment of device 1100. In some embodiments, device 1100 is a mobile phone, in which case user interface 1150 may comprise a microphone, a loudspeaker, slidable buttons, depressable buttons, a keypad, a keyboard, a display, a touchscreen display, and/or any other user-interface features commonly found on mobile phones. In other embodiments, device 1100 is a data modem capable of being utilised with a host computing device, such as a PCMCIA data card or a modem capable of being plugged into a USB port of the host computing device. In these embodiments, user interlace 1150 may be very simple or may utilise features of the host computing device, such as the host device's display and/or keyboard.

Host interface 1160 of device 1100 also may take various forms depending on the particular embodiment of device 1100. In embodiments where device 1100 is a mobile phone, host interface 1160 may comprise a USB interface, an HDMI interface, or the like. In the embodiments where device 1100 is a data modem capable of being utilised with a host computing device, host interface may be a USB or PCMCIA interface.

In some embodiments, device 1100 may comprise more functionality than is shown in FIG. 9. In some embodiments, device 1100 may also comprise functionality such as a video and/or still-image camera, media player, etc., and radio transceiver 1140 may include circuitry necessary to communicate using additional radio-frequency communication standards including GSM, GPRS, EDGE, UMTS, HSPA, CDMA2000, LTE, WiFi, Bluetooth, GPS, and/or others. Persons of ordinary skill in the art will recognise the above list of features and radio-frequency communication standards is merely exemplary and not limiting to the scope of the present disclosure. Accordingly, processor 1110 may execute software code stored in program memory 1120 to control such additional functionality.

Figure 12:
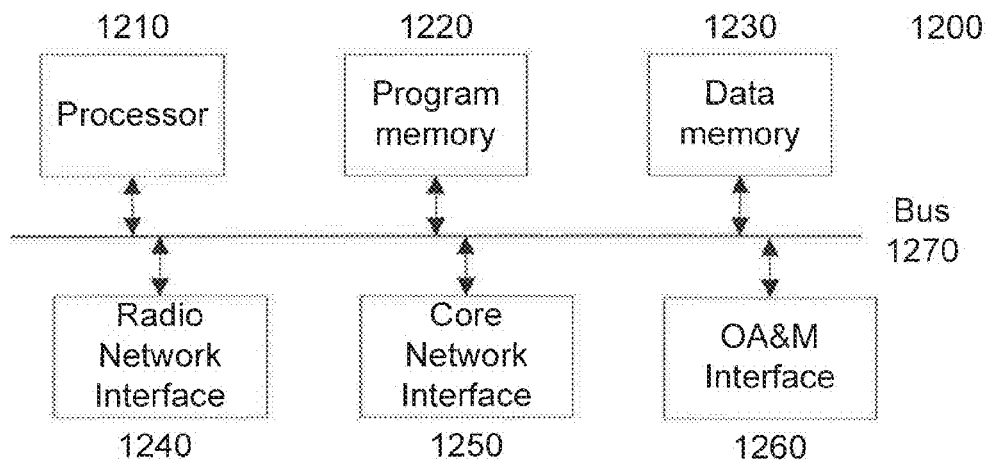
FIG. 12 is a block diagram of an exemplary network equipment, such as an eNB in an E-UTRAN, according to one or more embodiments of the present disclosure.

FIG. 12 is a block diagram of an exemplary network equipment 1200, such as an eNB, utilising certain embodiments of the present disclosure, including those described above with reference to FIGS. 6 to 9. Network equipment 1200 comprises processor 1210 which is operably connected to program memory 1220 and data memory 1230 via bus 1270, which may comprise parallel address and data buses, serial ports, or other methods and/or structures known to those of ordinary skill in the art. Program memory 1220 comprises software code executed by processor 1210 that enables network equipment 1200 to communicate with one or more other devices using protocols according to various embodiments of the present disclosure, including the Radio Resource Control (RRC) protocol and improvements thereto. Program memory 1220 also comprises software code executed by processor 1210 that enables network equipment 1200 to communicate with one or more other devices using other protocols or protocol layers, such as one or more of the PHY, MAC RLC, PDCP, and RRC layer protocols standardised by 3GPP, or any other higher-layer protocols utilised in conjunction with radio network interface 1240 and core network interface 1250. By way of example and without limitation, core network interface 1250 may comprise the S1 interface and radio network interface 1250 may comprise the Uu interface, as standardised by 3GPP. Program memory 1220 further comprises software code executed by processor 1210 to control the functions of network equipment 1200, including configuring and controlling various components such as radio network interface 1240 and core network interface 1250.

Data memory 1230 may comprise memory area for processor 1210 to store variables used in protocols, configuration, control and other functions of network equipment 1200. As such, program memory 1220 and data memory 1230 may comprise non-volatile memory (e.g. flash memory, hard disk, etc.), volatile memory (e.g. static or dynamic RAM), network-based (e.g. "cloud") storage, or a combination thereof. Persons of ordinary skill in the art will recognise that processor 1210 may comprise multiple individual processors (not shown), each of which implements a portion of the functionality described above. In such cases, multiple individual processors may be commonly connected to program memory 1220 and data memory 1230 or individually connected to multiple individual program memories and/or data memories. More generally, persons of ordinary skill in the art will recognise that various protocols and other functions of network equipment 1200 may be implemented in many different combinations of hardware and software including, but not limited to, application processors, signal processors, general-purpose processors, multi-core processors, ASICs, fixed digital circuitry, programmable digital circuitry, analog baseband circuitry, radio-frequency circuitry, software, firmware, and middleware.

Radio network interface 1240 may comprise transmitters, receivers, signal processors, ASICs, antennas, beamforming units, and other circuitry that enables network equipment 1200 to communicate with other equipment such as, in some embodiments, a plurality of compatible user equipments (UEs). In some embodiments, radio network interface may comprise various protocols or protocol layers, such as the LTE PHY, MAC, RLC, PDCP, and RRC layer protocols standardised by 3GPP, improvements thereto such as described herein with reference to one of more FIGS. 6 to 10, or any other higher-layer protocols utilised in conjunction with radio network interface 1240. In some embodiments, radio network interface 1240 may comprise the PHY layer transmitter described above with reference to FIG. 10. In some embodiments, the radio network interface 1240 may comprise a PHY layer based on orthogonal frequency division multiplexing (OFDM) or orthogonal frequency division multiple access (OFDMA) technologies.

Core network Interface 1250 may comprise transmitters, receivers, and other circuitry that enables network equipment 1200 to communicate with other equipment in a core network such as, in some embodiments, circuit-switched (CS) and/or packet-switched (PS) core networks. In some embodiments, core network interface 1250 may comprise the S1 interface standardised by 3GPP. In some embodiments, core network interface 1250 may comprise one or more interfaces to one or more SGWs, MMEs, SGSNs, GGSNs, and other physical devices that comprise functionality found in GERAN, UTRAN, E-UTRAN, and CDMA2000 core networks that are known to persons of ordinary skill in the art. In some embodiments, these one or more interfaces may be multiplexed together on a single physical interface. In some embodiments, lower layers of core network interface 1250 may comprise one or more of asynchronous transfer mode (ATM), Internet Protocol (IP)-over-Ethernet, SDH over optical fiber, T1/E1/PDH over a copper wire, microwave radio, or other wired or wireless transmission technologies known to those of ordinary skill in the art.

OA&M interface 1260 may comprise transmitters, receivers, and other circuitry that enables network equipment 1200 to communicate with external networks, computers, databases, and the like for purposes of operations, administration, and maintenance of network equipment 1200 or other network equipment operably connected thereto. Lower layers of OA&M interface 1260 may comprise one or more of asynchronous transfer mode (ATM), Internet Protocol (IP)-over-Ethernet, SDH over optical fiber, T1/E1/PDH over a copper wire, microwave radio, or other wired or wireless transmission technologies known to those of ordinary skill in the art. Moreover, in some embodiments, one or more of radio network interface 1240, core network interface 1250, and OA&M interface 1260 may be multiplexed together on a single physical interface, such as the examples listed above.

As described herein, a device or apparatus may be represented by a semiconductor chip, a chipset, or a (hardware) module comprising such chip or chipset; this, however, does not exclude the possibility that a functionality of a device or apparatus, instead of being hardware implemented, be implemented as a software module such as a computer program or a computer program product comprising executable software code portions for execution or being run on a processor. A device or apparatus may be regarded as a device or apparatus, or as an assembly of multiple devices and/or apparatus, whether functionally in cooperation with or independently of each other. Moreover, devices and apparatus may be implemented in a distributed fashion throughout a system, so long as the functionality of the device or apparatus is preserved. Such and similar principles are considered as known to a skilled person.

More generally, even though the present disclosure and exemplary embodiments are described above with reference to the examples according to the accompanying drawings, it is to be understood that they are not restricted thereto. Rather, it is apparent to those skilled in the art that the disclosed embodiments can be modified in many ways without departing from the scope of the disclosure herein. Moreover, the terms and descriptions used herein are set forth by way of illustration only and are not meant as limitations. Those skilled in the art will recognise that many variations are possible within the scope of the present invention as defined in the following claims, and their equivalents, in which all terms are to be understood in their broadest possible sense unless otherwise indicated.

What is claimed is:

1. A wireless communication device, comprising:
a receiver;
a processor and at least one memory including program code which, when executed by the processor, causes the wireless communication device to:
decode resource mapping information from a subframe signal received via the receiver to obtain information about arrangement of one or more control channels for subframe signals, each subframe signal comprising a plurality of physical resource blocks (PRBs) only a portion of which are occupied by the one or more control channels;
determine, based on the obtained information about arrangement of the one or more control channels for subframe signals, information related to aggregation level (AL) of one or more of the control channels of a common subframe signal and information related to PRBs comprising one or more elements of the one or more of the control channels of the common subframe signal, the information related to PRBs comprising PRB cluster size wherein a PRB cluster comprises a plurality of PRBs and a number of PRBs in each PRB cluster is variable such that a first one of the PRB clusters has a different number of PRBs than a second one of the PRB clusters for each different bandwidth;
decode one or more elements of a control channel from another subframe signal received via the receiver, based on the determined information related to the PRBs comprising that control channel and the determined information related to the AL of that same control channel, the decoding comprising determining interleaving depth (IDP) of the PRB cluster comprising the one or more elements of that control channel;
form a control message from the one or more elements of that control channel; and
provide the control message to a higher protocol layer.

2. The wireless communication device according to claim 1, wherein the IDP for at least one of the PRB clusters is determined based on a linear relationship to the variable number of PRBs comprising the PRB cluster such that the decoding of the one or more elements of the control channel from the another subframe signal is based on the number of PRBs in the PRB cluster.

3. The wireless communication device according to claim 1, wherein the IDP for at least one of the PRB clusters is determined as being equal to the number of PRBs comprising the PRB cluster such that the decoding of the one or more elements of the control channel from the another subframe signal is based on the number of PRBs in the PRB cluster.

4. The wireless communication device according to claim 1, wherein the IDP for at least one of the PRB clusters is determined based on an index number of the PRB cluster such that the decoding of the one or more elements of the control channel from the another subframe signal is based on at least one of the index number of the PRB cluster and the number of PRBs in the PRB cluster.

5. The wireless communication device according to claim 1, wherein the program code, when executed by the processor, is further arranged to cause the wireless communication device to:
determine information related to the AL of at least one of the one or more control channels by selecting the AL from among a set of valid AL values, at least one of the AL values having an associated IDP value that is different than the IDP value associated with another of the AL values; and
determine the IDP of the PRB cluster comprising the one or more elements of the control channel by selecting the IDP value associated with the AL value selected for the control channel.

6. The wireless communication device according to claim 1, wherein:
the wireless communication device is an LTE user equipment (UE);
the one or more control channels are enhanced physical downlink control channels (ePDCCHs);
the elements are enhanced control channel elements (eCCEs); and
each subframe signal is an orthogonal frequency division multiplexed (OFDM) signal.

7. The wireless communication device according to claim 6, wherein
each of the PRBs comprises an enhanced resource element group (eREG);
the program code being arranged to cause the wireless communication device to decode one or more elements of the control channel by combining the content of the eREGs of PRBs comprising a PRB cluster, based on the IDP of the PRB cluster, to form one or more eCCEs.

8. A method for physical (PHY) layer reception in a wireless communication device, the method comprising:
receiving a subframe signal comprising a plurality of physical resource blocks (PRBs) only a portion of which are occupied by any control channels;
decoding resource mapping information from the received subframe signal to obtain information about arrangement of one or more control channels for subframe signals;
determining, based on the obtained information about arrangement of the one or more control channels for subframe signals, information related to aggregation level (AL) of one or more of the control channels of a common subframe signal and information related to PRBs comprising one or more elements of the one or more of the control channels of a common subframe signal, the information related to PRBs comprising PRB cluster size wherein a PRB cluster comprises a plurality of PRBs and a number of PRBs in each PRB cluster is variable such that a first one of the PRB clusters has a different number of PRBs than a second one of the PRB clusters for each different bandwidth;
decoding one or more elements of a control channel from another subframe signal comprising a plurality of PRBs, based on the determined information related to the PRBs comprising that control channel and the determined information related to the AL of that same control channel, the decoding comprising determining interleaving depth (IDP) of the PRB cluster comprising the one or more elements of that control channel;
forming a control message from the one or more elements of that control channel; and
providing the control message to a higher protocol layer.

9. The method according to claim 8, wherein the IDP for the PRB cluster comprising the one or more elements of at least one of the one or more control channels is determined based on a linear relationship to the number of PRBs comprising the PRB cluster such that the decoding of the one or more elements of the control channel from the another subframe signal is based on the number of PRBs in the PRB cluster.

10. The method according to claim 8, wherein the IDP for the PRB cluster comprising the one or more elements of at least one of the one or more control channels is determined as being equal to the number of PRBs comprising the PRB cluster such that the decoding of the one or more elements of the control channel from the another subframe signal is based on the number of PRBs in the PRB cluster.

11. The method according to claim 8, wherein the IDP for the PRB cluster comprising the one or more elements of at least one of the one or more control channels is determined based on an index number of the PRB cluster such that the decoding of the one or more elements of the control channel from the another subframe signal is based on at least one of the index number of the PRB cluster and the number of PRBs in the PRB cluster.

12. The method according to claim 8, wherein:
determining information related to the AL of at least one of the one or more control channels comprises selecting the AL from among a set of valid AL values, at least one of the AL values having an associated IDP value that is different than the IDP value associated with another of the AL values; and
determining the IDP of the PRB cluster comprising the one or more elements of the control channel comprises selecting the IDP value associated with the AL value selected for the control channel.

13. The method according to claim 8, wherein:
the wireless communication device is an LTE user equipment (UE);
the one or more control channels are enhanced physical downlink control channels (ePDCCHs);
the elements are enhanced control channel elements (eCCEs); and
each subframe signal is an orthogonal frequency division multiplexed (OFDM) signal.

14. The method according to claim 13, wherein:
each of the PRBs comprises an enhanced resource element group (eREG); and
decoding one or more elements of the control channel comprises combining the content of the eREGs of PRBs comprising a PRB cluster, based on the IDP of the PRB cluster, to form one or more eCCEs.

15. A non-transitory computer-readable storage medium comprising a set of instructions stored thereon that, when executed on a wireless communication device, causes the wireless communication device to:
decode resource mapping information from a received subframe signal to obtain information about arrangement of one or more control channels for subframe signals, each subframe signal comprising a plurality of physical resource blocks (PRBs) only a portion of which are occupied by the one or more control channels;
determine, based on the obtained information about arrangement of the one or more control channels for subframe signals, information related to aggregation level (AL) of one or more of the control channels of a common subframe signal and information related to PRBs comprising one or more elements of the one or more of the control channels of a common subframe signal, the information related to PRBs comprising PRB cluster size wherein a PRB cluster comprises a plurality of PRBs and a number of PRBs in each PRB cluster is variable such that a first one of the PRB clusters has a different number of PRBs than a second one of the PRB clusters for each different bandwidth;
decode one or more elements of a control channel from another subframe signal, based on the determined information related to the PRBs comprising that control channel and determined information related to the AL of that same control channel, the decoding comprising determining interleaving depth (IDP) of the PRB cluster comprising the one or more elements of the control channel;
form a control message from the one or more elements of that control channel; and
provide the control message to a higher protocol layer.

16. A network equipment, comprising:
a transmitter;
a processor and at least one memory including program code which, when executed by the processor, causes the network equipment to:
determine an aggregation level (AL) for each of one or more control channels which are to be used to transmit via the transmitter, during a subframe using the one or more control channels, one or more messages received from one or more higher protocol layers, wherein the AL for a control channel comprises a number of elements required for the control channel;
allocate a plurality of physical resource blocks (PRBs) for transmitting the one or more control channels of a common subframe and partitioning the plurality of PRBs into PRB clusters, each of the PRB clusters comprising a plurality of PRBs and a number of PRBs in each PRB cluster being variable such that a first one of the PRB clusters has a different number of PRBs than a second one of the PRB clusters for each different bandwidth;
determine the interleaving depth (IDP) for each of the PRB clusters;
map each of the elements to one of the PRB clusters according to the IDP determined for that PRB cluster;
generate a transmission signal comprising the PRB cluster such that only a portion of the PRBs in the transmission signal are occupied by any control channels.

17. The network equipment according to claim 16, wherein the IDP for at least one of the PRB clusters has a linear relationship to the variable number of PRBs comprising that PRB cluster.

18. The network equipment according to claim 15, wherein the IDP for at least one of the PRB clusters is identical to the number of PRBs comprising that PRB cluster.

19. The network equipment according to claim 16, wherein the IDP for at least one of the PRB clusters has a relationship to an index of that PRB cluster.

20. The network equipment according to claim 16, wherein the program code, when executed by the processor, further causes the network equipment to equipment to:
determine the AL for each of the one or more control channels by selecting the AL from among a set of valid AL values, at least one of the AL values having an associated IDP value that is different than the IDP value associated with another of the AL values; and
determine the IDP for each of the PRB clusters by selecting the IDP value associated with the AL value selected for the control channel corresponding to the PRB cluster.

21. The network equipment according to claim 16, wherein:

the plurality of PRBS are partitioned into a plurality of PRB clusters; and the IDPs determined for the plurality of PRB clusters comprise a plurality of different IDP values.

22. The network equipment according to claim 16, wherein:

the network equipment is an LTE evolved Node B (eNB);

the one or more control channels are enhanced physical downlink control channels (ePDCCHs);

the elements are enhanced control channel elements (eCCEs); and the transmission signal is an orthogonal frequency division multiplexed (OFDM) transmission signal.

23. The network equipment according to claim 22, wherein:

each of the allocated PRBs comprises an enhanced resource element group (eREG);

the program code being arranged to cause the network equipment to map each of the eCCEs to one of the PRB clusters by distributing the eCCE to the eREGs comprising that PRB cluster.

24. The network equipment according to claim 16, wherein the program code, when executed by the processor, further causes the network equipment to:

allocate a plurality of data PRBs for transmitting one or more data channels which are to be used to transmit, during a subframe using the one or more data channels, one or more messages received from one or more higher protocol layers, and partitioning the plurality of data PRBs into one or more data PRB clusters; and map each of the data channels to one of the one or more data PRB clusters;

wherein the transmission signal further comprises the one or more data PRB clusters.

25. A method for physical (PHY) layer transmission in a network equipment, the method comprising:

receiving, from one or more higher protocol layers, one or more messages to be transmitted during a subframe using one or more control channels;

determining an aggregation level (AL) for each of the one or more control channels, wherein the AL for a control channel comprises the number of elements required for the control channel;

allocating a plurality of physical resource blocks (PRBs) for transmitting the one or more control channels of a common subframe and partitioning the plurality of PRBs into PRB clusters, each of the PRB clusters comprising a plurality of PRBs and a number of PRBs in each PRB cluster being variable such that a first one of the PRB clusters has a different number of PRBs than a second one of the PRB clusters for each different bandwidth;

determining the interleaving depth (IDP) for each of the PRB clusters;

mapping each of the elements to one of the PRB clusters according to the IDP determined for that PRB cluster; and generating a transmission signal comprising the PRB cluster such that only a portion of the PRBs in the transmission signal are occupied by any control channels.

26. A non-transitory computer-readable storage medium comprising a set of instructions stored thereon that, when executed by a network equipment, causes the network equipment to:

determine an aggregation level (AL) for each of one or more control channels which are to be used to transmit, during a subframe using the one or more control channels, one or more messages received from one or more higher protocol layers, wherein the AL for a control channel comprises the number of elements required for the control channel;

allocate a plurality of physical resource blocks (PRBs) for transmitting the one or more control channels of a common subframe and partitioning the plurality of PRBs into PRB clusters, each of the PRB clusters comprising a plurality of PRBs and a number of PRBs in each PRB cluster being variable such that a first one of the PRB clusters has a different number of PRBs than a second one of the PRB clusters for each different bandwidth;

determine the interleaving depth (IDP) for each of the PRB clusters;

map each of the elements to one of the PRB clusters according to the IDP determined for that PRB cluster;

generate a transmission signal comprising the PRB cluster such that only a portion of the PRBs in the transmission signal are occupied by any control channels.

* * * * *